United States Patent [19]
Dolle

[11] Patent Number: 5,127,319
[45] Date of Patent: Jul. 7, 1992

[54] APPARATUS FOR THE DISTRIBUTION OF SKEWERS, ESPECIALLY WOODEN SKEWERS INTENDED FOR MAKING BORCHETTES, AMONG RESPECTIVE BORES OF A RECEPTION APPARATUS, SUCH AS A LOADING APPARATUS OF A SKEWERING MACHINE

[76] Inventor: Jacques Dolle, Chemin de Bel Air, Impasse d'Eden, 30650 Rochefort Du Gard, France

[21] Appl. No.: 682,651

[22] Filed: Apr. 9, 1991

[30] Foreign Application Priority Data

Apr. 10, 1990 [FR] France .................. 90 04578

[51] Int. Cl.⁵ .................................... A22C 17/02
[52] U.S. Cl. ................... 99/419; 99/421 H; 99/532
[58] Field of Search ......... 99/419, 420, 421 R, 99/421 H, 443 C, 450.1, 494; 452/149, 174; 227/139; 83/466.1; 29/432

[56] References Cited
U.S. PATENT DOCUMENTS

| 2,303,566 | 12/1942 | Majestic | 99/419 |
| 3,405,422 | 10/1968 | Sico | 99/419 |
| 3,691,608 | 9/1972 | Lowrance | 227/139 |
| 3,729,774 | 5/1973 | Chow | 99/420 |
| 3,835,761 | 9/1974 | Yamanaka | 99/443 C |
| 4,440,071 | 4/1984 | Boosalis et al. | 99/420 |
| 4,583,263 | 4/1986 | Wigley, Jr. | 99/419 |
| 4,604,771 | 8/1986 | Dolle | 99/419 |
| 4,837,895 | 6/1989 | Emsens | 99/419 |
| 4,893,553 | 1/1990 | Emsens | 99/421 R |
| 4,934,026 | 6/1990 | McNerney | 99/419 |

FOREIGN PATENT DOCUMENTS

| 853043 | 7/1977 | Belgium . |
| 2345948 | 10/1977 | France . |
| 2634982 | 2/1982 | France . |
| 2616124 | 4/1978 | Netherlands . |
| 7803849 | 4/1978 | Netherlands . |
| 3820533 | 12/1989 | Netherlands . |

Primary Examiner—Timothy F. Simone
Attorney, Agent, or Firm—Blakely Sokoloff Taylor & Zafman

[57] ABSTRACT

The present invention relates to an apparatus for distributing skewers, especially wooden skewers intended for making brochettes, among respective bores of a reception apparatus, such as a loading apparatus of a skewering machine.

Cradles (193), each of which is capable of receiving a skewer (2), travel past a skewer take-up location (134) and then a location (113) for transferring the skewers (2) towards the reception apparatus (1). To ensure that skewers (2) having natural bending are taken up, each cradle takes up each skewer (2) only over a dimension ($2L_8$) substantially smaller than the length (L) of the latter.

20 Claims, 8 Drawing Sheets

FIG_2

FIG_3

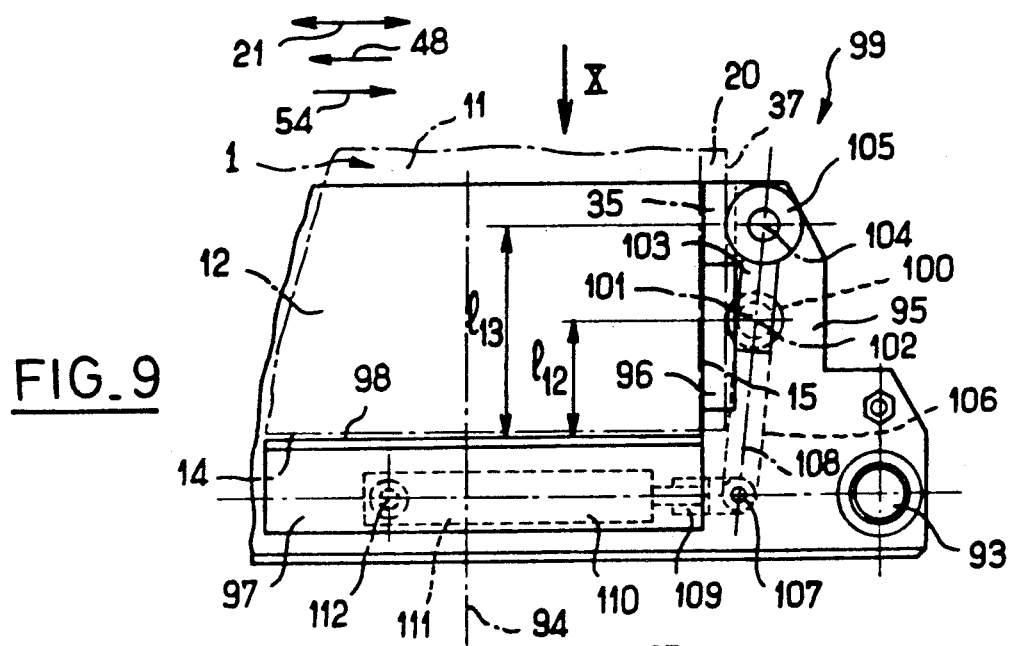

APPARATUS FOR THE DISTRIBUTION OF SKEWERS, ESPECIALLY WOODEN SKEWERS INTENDED FOR MAKING BORCHETTES, AMONG RESPECTIVE BORES OF A RECEPTION APPARATUS, SUCH AS A LOADING APPARATUS OF A SKEWERING MACHINE

BACKGROUND OF THE INVENTION

1. Field of the Invention

The present invention relates to an apparatus for the distribution of skewers having, in the free state, an approximately rectilinear shape, a mid-axis, an approximately specific length along this mid-axis and an approximately constant cross-section of approximately specific diameter perpendicularly to this mid-axis, especially wooden skewers intended for making brochettes, among respective bores of a reception apparatus, such as a loading apparatus of a skewering machine, the said bores being parallel to one another and mutually juxtaposed in a row in which they are spaced from one another at a specific interval, the said distribution apparatus comprising for this purpose:

a plurality of cradles oriented in a specific longitudinal direction, mutually juxtaposed transversely and spaced transversely from one another at the said interval, each cradle having a cross-section corresponding approximately to the said cross-section of a skewer and being open, on the one hand, in one specific transverse way and, on the other hand, both ways of the said longitudinal direction, means for, on the one hand, presenting each cradle at a location for the take-up of a respective skewer and, on the other hand, placing the cradles and the reception apparatus in such a relative position that each cradle is located opposite a respective bore in the said longitudinal direction, at a location for the transfer of the skewers from the cradles towards the reception apparatus, means for receiving skewers in the mutually juxtaposed state and presenting them successively at the said take-up location, in such a way that their mid-axes are oriented approximately in the said longitudinal direction and that they are respectively approximately symmetrical in relation to a specific transverse plane, and for respectively introducing into each cradle oppositely to the said transverse way a skewer, the mid-axis of which is oriented approximately in the said longitudinal direction, at the said take-up location, means for imparting to the skewers introduced into the cradles a translational movement one specific way of the said longitudinal direction going from the cradles towards the reception apparatus, at the said transfer location, in order to disengage the skewers from the cradles and engage them into the bores.

2. Description of the Prior Art

In a known embodiment described in French Patent Application No. 2,345,948, such an apparatus is integrated in an apparatus for preparing coherent products with deformable food substances, and ensures the skewering of these products, known in the Netherlands as "satay", onto relatively short wooden skewers, that is to say of a length not exceeding approximately fifteen centimeters.

In this known embodiment, skewers are placed in a hopper so as to have approximately the same horizontal longitudinal direction, and arranged under this hopper is a plurality of cradles oriented in this same longitudinal direction and mutually juxtaposed transversely relative to this horizontally; each cradle has a longitudinal dimension at least equal to the said length and a cross-section corresponding substantially to the cross-section of a skewer over this entire longitudinal dimension, in such a way that a skewer can penetrate into it only if its shape is substantially rectilinear and that a skewer which is thus penetrated into a cradle is maintained in this substantially rectilinear shape. even if it has a natural tendency to bend; insofar as this tendency is common in wooden skewers, above each cradle are arranged means compelling these skewers to straighten themselves again before arriving at the respective cradle; furthermore, associated with each cradle is a longitudinal rod capable of sliding longitudinally in the respective cradle in order to impart to the skewers located in it a translational movement towards the reception apparatus consisting, in practice, of an apparatus for molding coherent products from deformable food substances.

This known embodiment is satisfactory insofar as the skewers have a small length which generally limits the amount of sag which they can assume as a result of bending and makes complex bending insignificant, with the result that the means provided above the cradles for straightening the skewers again can usually achieve this, so as to allow a uniform feed of skewers to the cradles. However, as soon as a skewer in the still bent state comes in front of a cradle, it can penetrate into it only partially, and therefore either the apparatus is jammed, thus making it necessary to stop it and partially disassemble it to extract the offending skewer from it, or the apparatus continues to operate, but a cradle remains empty, thus resulting, on the one hand, in rejects and, on the other hand, in this same need to stop the apparatus in order to extract the offending skewer from it.

This disadvantage becomes more serious if the length of the skewers increases, especially if it is considered adopting this embodiment for distributing skewers of a length of the order of 25 to 30 cm, as with skewers traditionally used for making brochettes; in fact, the greater the length of a skewer, on the one hand the larger the amount of sag which it can assume and on the other hand the more appreciable is the complex nature of its possible bending.

In particular, it seems impossible to integrate the embodiment of a skewer distribution apparatus described in French Patent Application No. 2,345,948 into an automatic skewering machine using skewers of such a length, without risking an unacceptable proportion of rejects and an inadmissible frequency of stopping of the line in order to extract the skewers which it was not possible to make sufficiently rectilinear to allow them to be introduced into the cradles.

BRIEF DESCRIPTION OF THE DRAWINGS

The object of the present invention is to overcome these disadvantages, and to achieve this the apparatus according to the invention, of the type mentioned in the preamble, is defined in that each cradle possesses, in the said longitudinal direction, a dimension substantially smaller than the said length and has a transverse plane of symmetry coinciding approximately with the said specific transverse plane at the said take-up location, so as to take up a respective skewer, whilst preserving substantially the said shape for it, at the said take-up location.

The present invention thus arises as a result of an intellectual approach completely opposite to that expressed in French Patent Application No. 2,345,948, since, instead of seeking to compel the bent skewers to straighten themselves again before they are introduced into the cradles in order to maintain them in the rectilinear state in the cradles, the present invention proposes taking up the skewers, as they occur in the free state, thus making it possible for each cradle to have a cross-section corresponding approximately to the cross-section of a skewer over a dimension in the longitudinal direction substantially smaller than the length of a skewer; thus, whilst dispersing with means intended for straightening the skewers again before they are introduced into the cradles, this corresponding to a simplification in comparison with the teachings of French Patent Application No. 2,345,948, it is certain that skewers, even those bent severely and/or in a complex way, are taken up effectively by the cradles; consequently, there is a considerable reduction in the risks that the apparatus will be jammed by a skewer bent too severely or in too complex a manner, the risks of rejection because of the absence of a skewer during subsequent skewering and the need to stop the apparatus in order to extract from it skewers, the presence of which could have led to such disorders, and it becomes possible to integrate a skewer distribution apparatus into a truly automatic line, especially into an automatic skewering machine.

Figure 1:
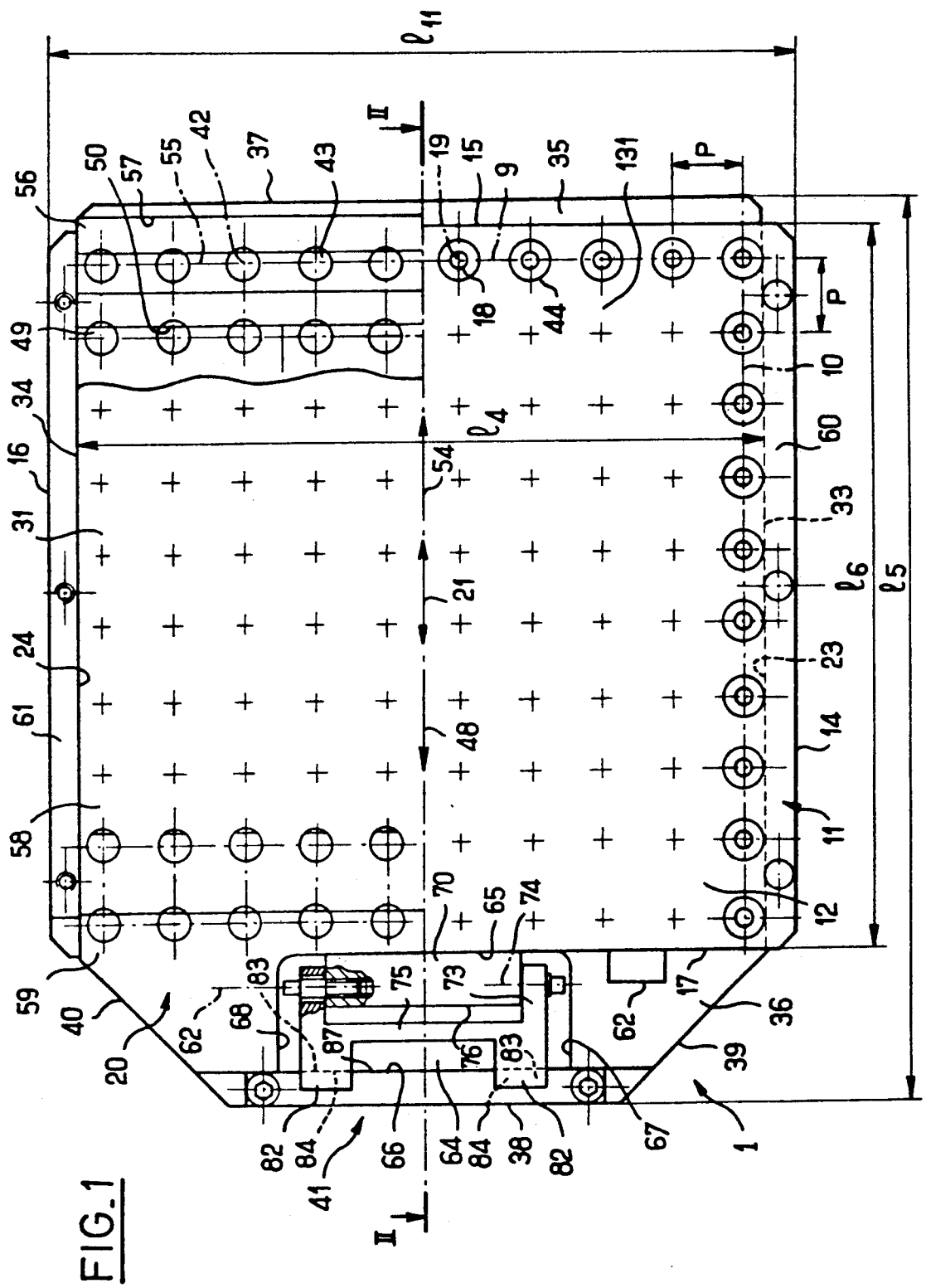

Tests have shown that it is preferable if, in the said longitudinal direction, each cradle has a dimension at least equal to one third of the said length, although this figure is given as a non-limiting example; in general terms, this dimension of the cradle in the longitudinal direction is taken as being the dimension over which the cradle has a cross-section corresponding approximately to the cross-section of a skewer.

Thus, according to a preferred embodiment of the apparatus according to the invention, each cradle is formed from two indentations aligned with one another in the said longitudinal direction and spaced from one another in the said longitudinal direction at a spacing smaller than the said length, each indentation having the said cross-section and being open, on the one hand, in the said specific transverse way, and on the other hand, both ways of the said longitudinal direction, in such a way that, at the said take-up location, each skewer has two free end portions, a free middle portion between the said indentations and two intermediate portions engaged in the said indentations; such an embodiment of each cradle makes it possible to ensure the introduction into each of them not only of skewers exhibiting pronounced bending, but also of skewers exhibiting complex bending, since each skewer is compelled to be integrated in the cradle only in the region of the two indentations of a dimension far smaller than its length in the said longitudinal direction, whilst elsewhere each skewer is free; as a non-limiting example, the said spacing can be of the order of one third to three quarters of the length of a skewer.

Because each cradle possesses, in the said longitudinal direction, a dimension substantially smaller than the length of a skewer, making it possible to allow an end portion of each skewer to project from the cradle, it is no longer necessary to resort to rods penetrating into the cradles in order to expel the skewers from them towards the reception apparatus at the said transfer location, and according to a preferred embodiment of the apparatus according to the invention the means for imparting a translational movement to the skewers at the said transfer location comprise a transverse pushplate located opposite the reception apparatus in relation to the cradles and opposite these as a whole in the said longitudinal direction at the said transfer location, and means for driving the transverse pushplate in a to-and-fro movement in the said longitudinal direction. The apparatus is thereby simplified and its reliability thus increased.

Preferably and in a way known per se, the said longitudinal direction is approximately horizontal, this being assumed for the rest of the description and having the advantage of making it possible to utilize gravity to bring about some displacements of the skewers; however, the scope of the present invention would not be exceeded if this longitudinal direction were oriented otherwise, for example if it were oriented vertically, in which case the movements which will subsequently be shown as the result of gravity will have to be brought about by suitable means, especially for the transverse pushing of the skewers, the production of such means coming within the normal abilities of an average person skilled in the art.

According to a preferred embodiment of the apparatus according to the invention, when the said longitudinal direction is thus approximately horizontal, the means for receiving the skewers and successively presenting them at the said take-up location and for introducing a skewer into each cradle at the said take-up location comprise a skewer-receiving hopper overhanging the said take-up location, symmetrical relative to the said specific transverse plane and having in the said longitudinal direction a dimension substantially equal to the said length, and an approximately vertical passage opening upwards into the said hopper and downwards at the said take-up location, the said passage being symmetrical in relation to the said specific transverse plane and having, in horizontal section:

in the said longitudinal direction, a dimension at least equal to the said length, transversely to the said longitudinal direction, a dimension substantially equal to the said diameter over a longitudinal dimension substantially smaller than the said length, in a manner distributed symmetrically in relation to the said transverse plane, and a dimension substantially larger than the said diameter elsewhere.

This produces, between the hopper and the take-up location, a permanent stack of skewers oriented approximately in the said longitudinal direction, thereby making it certain that at each moment there is a skewer suitably arranged at the take-up location; as soon as a skewer is taken up by a cradle, the skewer immediately above it in the stack arrives by gravity at the take-up location and is ready subsequently to be taken up itself by a cradle.

The passage can be fed with skewers from the hopper solely as a result of the effect of gravity, but preferably means are provided for driving the skewers in an approximately horizontal transverse to-and-fro movement between the said hopper and the said passage; this makes it certain that a continuous stack of skewers is permanently present in the passage.

In view of the abovementioned dimensions of the said passage, when seen in horizontal section, this passage is suitable for receiving the skewers in the free state, even if they are bent in a pronounced or complex manner, to the same extent as each cradle, allowing the skewers freely to orient themselves approximately in the said longitudinal direction solely by virtue of the formation of the stack by gravity.

Like each cradle, the said passage possesses, for example, in horizontal section, transversely to the said longitudinal direction, a dimension substantially equal to the said diameter over a longitudinal dimension at most equal to one third of the said length, although this figure is only a non-limiting example; advantageously, the said passage comprises two groups, symmetrical to one another in relation to the said transverse plane, of two approximately vertical slideways parallel to and spaced from one another by approximately the said diameter respectively on either side of the said passage, the said groups being spaced from one another in the said longitudinal direction at a spacing smaller than the said length and, as a non-limiting example, of the order of one third to three quarters of the said length; this results in the same advantages of the possibility of receiving skewers bent in a pronounced or complex manner, without deformation stress and therefore without the risk of jamming.

The manner in which the take-up by a cradle of each skewer presented successively at the take-up location can have many alternative versions.

Thus, according to one embodiment of the apparatus according to the invention inspired by the apparatus described in French Patent Application No. 2,345,948 in that the take-up of the skewers makes use of gravity, the said transverse way is approximately vertically upwards, the means for presenting each cradle at the said take-up location comprise means for causing the cradles to travel past the said take-up location one specific way of an approximately horizontal transverse direction immediately below the said passage, and the said passage opens approximately vertically downwards so as to allow the skewers to descend one by one into the cradles by gravity.

The said transfer location can be merged with the take-up location, as described in French Patent Application 2,345,948, but these two locations are preferably separated.

Thus, according to this embodiment of an apparatus according to the invention, the said transfer location is preferably juxtaposed with the said take-up location the said one specific way of the said approximately horizontal transverse direction, and the means for placing the cradles and the reception apparatus in the said position relative to the said transfer location comprise means for arranging the reception apparatus in such a way that it is offset relative to alignment with the said hopper, on the one hand the said one specific way of the said transverse direction and on the other hand the said one specific way of the said longitudinal direction, that the said row is approximately horizontal and arranged in an approximately horizontal longitudinal plane common to the cradles, and that the said bores are longitudinal; such a dissociation of the transfer location and the take-up location makes it considerably easier to design an apparatus according to the invention intended for distributing skewers in a reception apparatus comprising a plurality of mutually parallel identical rows of bores occupying the same relative positions in the said rows, since it is thus especially easy to provide for the said means for placing the cradles of the reception apparatus in the said position relative to the said transfer location to comprise means for the sequential vertical translational movement of the reception apparatus in order to place each row of bores successively in the said approximately horizontal longitudinal plane and thereby allow an automatic loading of the various rows in succession.

However, because this first embodiment of an apparatus according to the invention makes use of gravity to introduce into the cradles each skewer presented successively at the take-up location, there is no certainty that a skewer will actually penetrate into each cradle when the latter comes opposite the take-up location, and it is preferable to have another embodiment of an apparatus according to the invention, in which the said transverse way is approximately horizontal, the means for presenting each cradle at the said take-up location comprise means for causing the cradles to travel past the said take-up location one specific way of an approximately vertical transverse direction, the said transverse way being oriented towards the said passage, at the said take-up location, the said passage opens out approximately horizontally the opposite way to the said transverse way, whilst it has approximately horizontal downward stop means for the skewers, and the means for receiving the skewers and successively presenting them at the said take-up location and for introducing a skewer into each cradle at the said take-up location comprise means for approximately horizontal transverse pushing the opposite way to the said transverse way, at a level immediately above that of the said stop means. The presence of the pushing means forcibly introducing a skewer into each cradle at the take-up location removes any uncertainty as to the actual presence of a skewer in each cradle and, in particular, allows the reliable automation of the apparatus.

According to this other embodiment of the invention, when, as mentioned above, the said passage is formed from two groups of two slideways, the pushing means advantageously comprise two pushers respectively adjacent to one of the said groups of slideways or the other at a level immediately above that of the said stop means for the skewers, and means for driving the said pushers in a synchronous to-and-fro movement in an approximately horizontal transverse direction, thus making it possible to ensure the effectiveness of these pushing means even in the case of skewers bent in a pronounced or complex manner, since the skewer situated at a given moment at the take-up location is stressed by the pushers in the immediate vicinity of the slideways ensuring its guidance, that is to say in a zone of this skewer occupying a perfectly defined position, whatever the way in which the skewer is presented elsewhere; to ensure this perfectly defined character, preferably the said stop means comprise two approximately horizontal shoulders respectively adjacent to each of the said groups of slideways.

Preferably, for automatic operation in this other embodiment, the apparatus according to the invention comprises means for controlling the means for presenting each cradle at the said take-up location and the pushing means, so as respectively to displace the cradles step by step the said way of the said approximately vertical transverse direction, by stopping the cradles successively at the said take-up location, and to push a respective skewer into each cradle stopped successively at the said take-up location.

This other embodiment of an apparatus according to the invention has an especially small bulk and a particularly simple design if, as is preferred, the said way of the said vertical transverse direction is downwards, if the said transfer location is located below the said take-up location, and if the means for placing the cradles and the reception apparatus in the said relative position comprise means for placing the reception apparatus at a level below that of the said take-up location, in such a way that it is offset relative to alignment with the said hopper the said specific way of the said longitudinal direction, that the said row is approximately vertical and arranged in an approximately vertical longitudinal plane common to the cradles, and that the said bores are longitudinal.

Such an arrangement is especially advantageous in that the apparatus according to the invention is to be used in relationship with a reception apparatus comprising a plurality of mutually parallel identical rows of holes occupying the same relative positions in the said rows; then, in fact, it is possible that the apparatus according to the invention comprise the said plurality of cradles, the said location for the take-up of a respective skewer, the said passage, the said stop means and the said location for the transfer of the skewers, each in the same number mutually juxtaposed the said transverse way as there are rows, that for each of the said pluralities of cradles there be respectively the said means for, on the one hand, presenting each cradle successively at the said respective location for the take-up of a skewer and, on the other hand, placing the cradles and the reception apparatus in the said position relative to the said respective location for the transfer of skewers, and the said means for imparting a translational movement to the skewers at the said respective location for the transfer of skewers, that it comprise means for synchronously controlling the said means for, on the one hand, presenting each cradle successively at the said respective location for the take-up of a skewer and, on the other hand, placing the cradles and the reception apparatus in the said position relative to the said respective location for the transfer of skewers and the said means for imparting a translational movement to the skewers at the said respective location for the transfer of skewers, and that the means for placing the cradles and the reception apparatus in the said position relative to the said respective transfer location comprise means for immobilizing the reception apparatus in a position in which each row of bores is arranged in a respective approximately vertical longitudinal plane common to the cradles of a respective plurality of cradles. It may be noted that, in relationship with such a reception apparatus, this other embodiment of an apparatus according to the invention proves more advantageous than the embodiment mentioned first, insofar as a respective plurality of cradles is associated with each row, thus making it possible to fill the respective holes of all the rows over a period of time during which only the holes of a single row can be filled in the first-mentioned embodiment of an apparatus according to the invention, unless this first-mentioned embodiment is multiplied in a particularly complex manner.

Other characteristics and advantages of an apparatus according to the invention will emerge from the following description relating to the two abovementioned embodiments selected by way of non-limiting example and from the accompanying drawings which form an integral part of this description.

As a non-limiting example, the apparatus according to the invention will be described with regard to the distribution of skewers in respective holes of a reception apparatus constituting an apparatus for the temporary retention of these skewers, such as a loading apparatus of a skewering machine.

Figure 2:
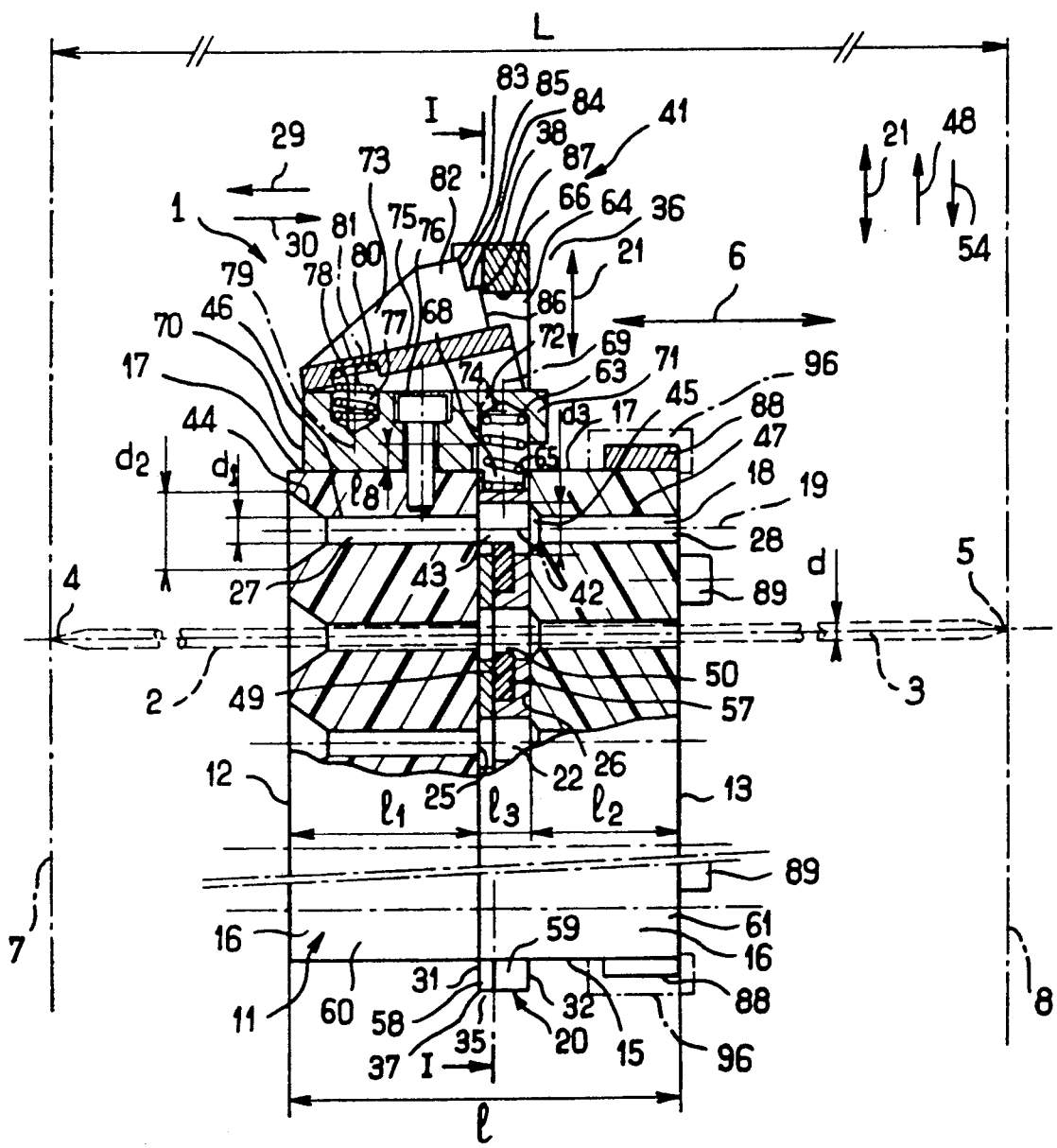

FIG. 1 shows such an apparatus for the temporary retention of a plurality of skewers, for use as a loading apparatus of a skewering machine, in the form of an apparatus for receiving skewers capable of interacting with an apparatus according to the invention, partially in a front view and partially in section in two half-planes designated by I—I in FIG. 2.

Figure 3:
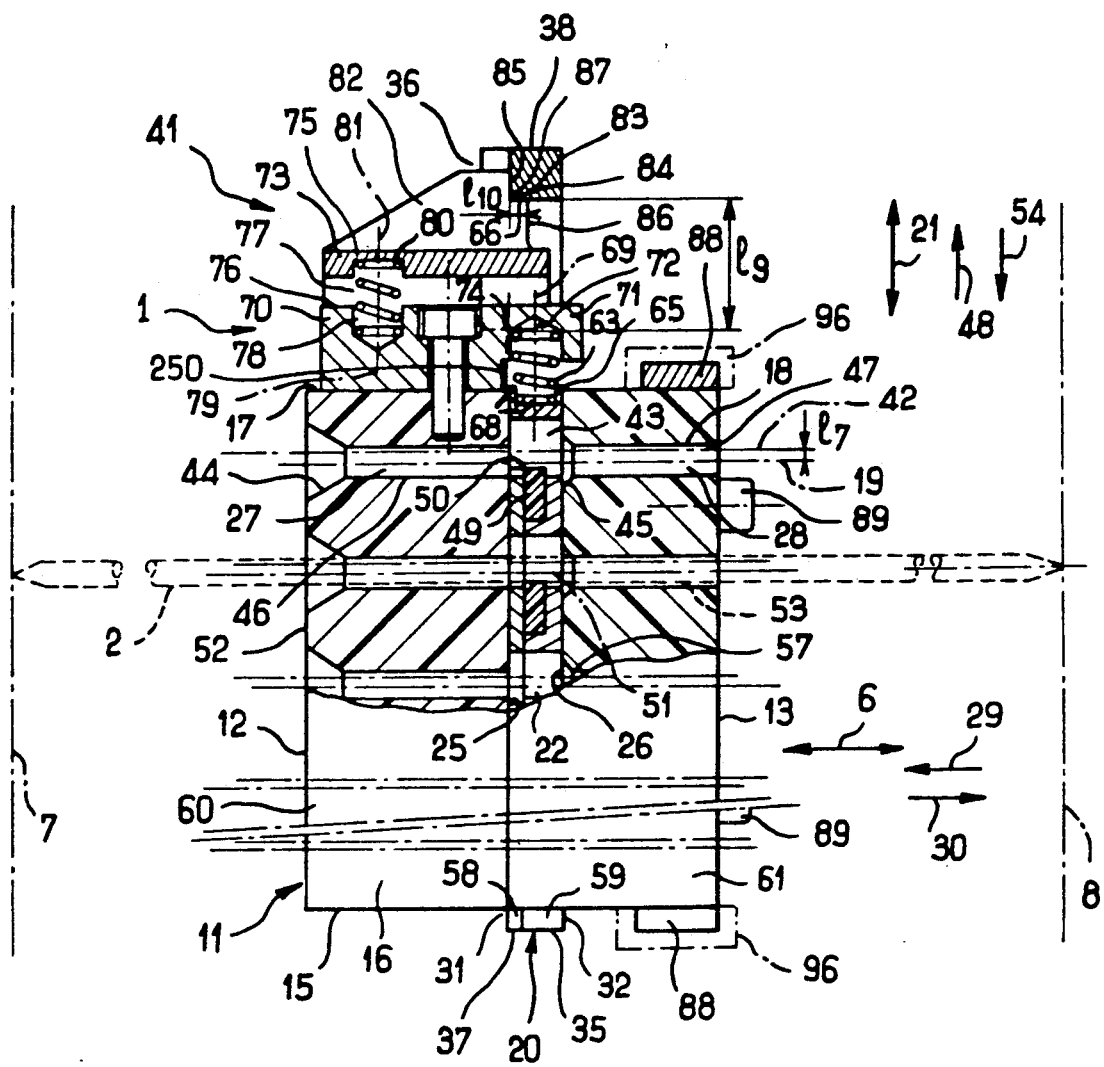

FIGS. 2 and 3 show a view of this temporary retention apparatus, partially in section in two half-planes designated by I—I in FIG. 1, respectively in a first state corresponding to that of FIG. 1 and in a second state.

Figure 4:
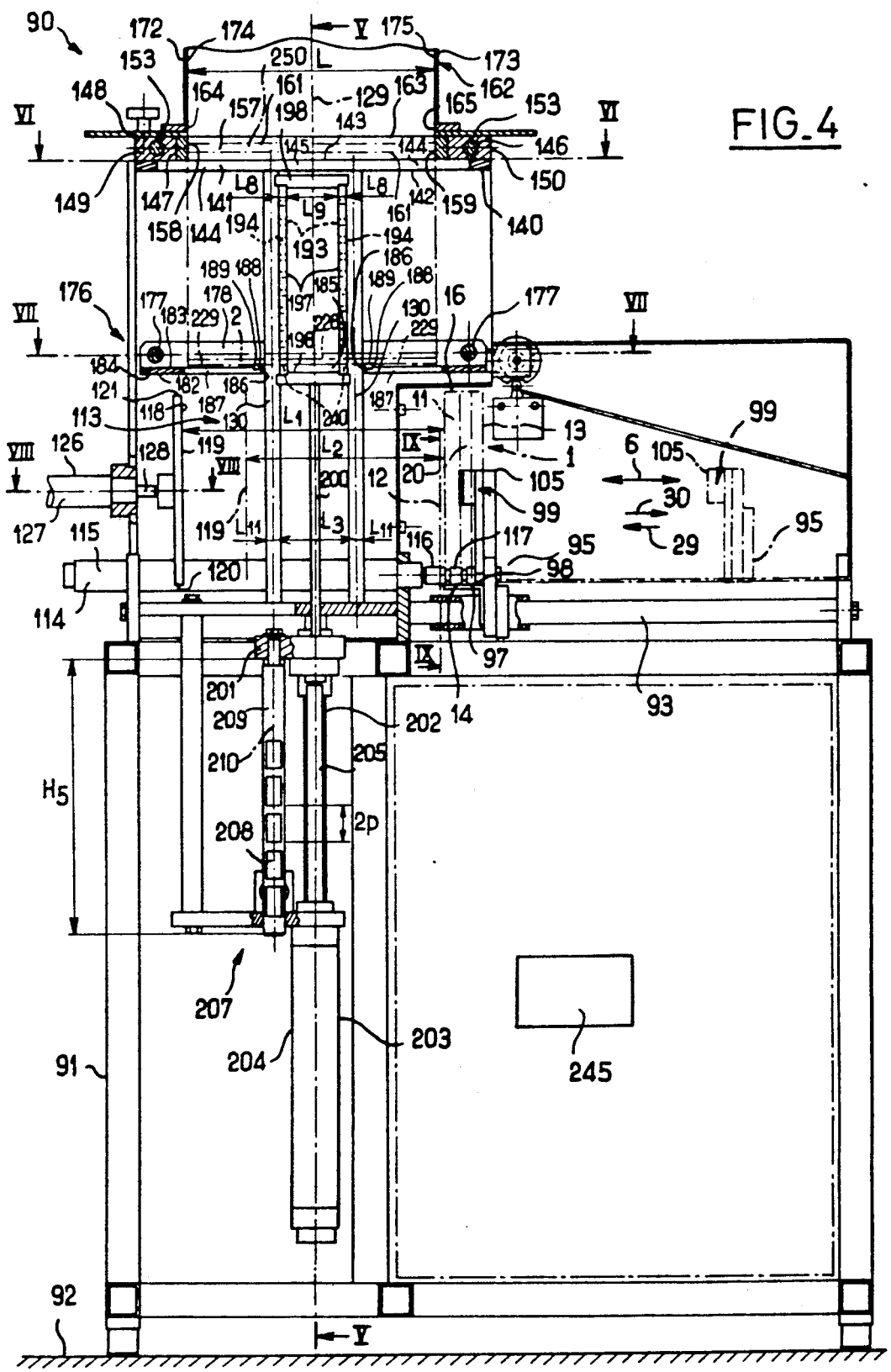
Figure 5:
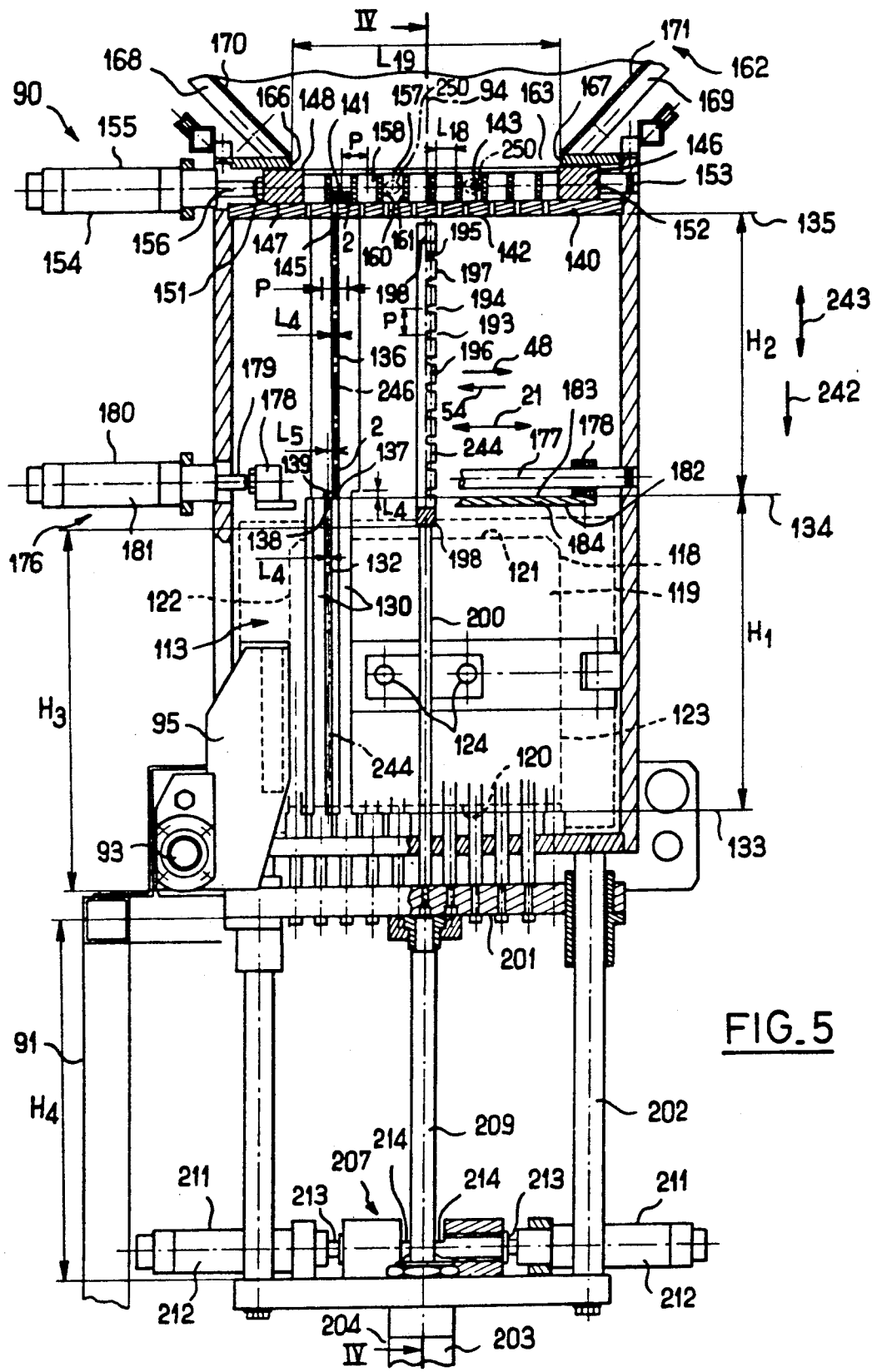

FIG. 4 shows a skewer distribution apparatus according to the invention, partially in elevation and partially in section in a general vertical plane of symmetry designated by IV—IV in FIG. 5.

FIG. 5 shows a detail of this apparatus, partially in section in a vertical plane designated by V—V in FIG. 4 and perpendicular to the plane designated by IV—IV in FIG. 5.

Figure 6:
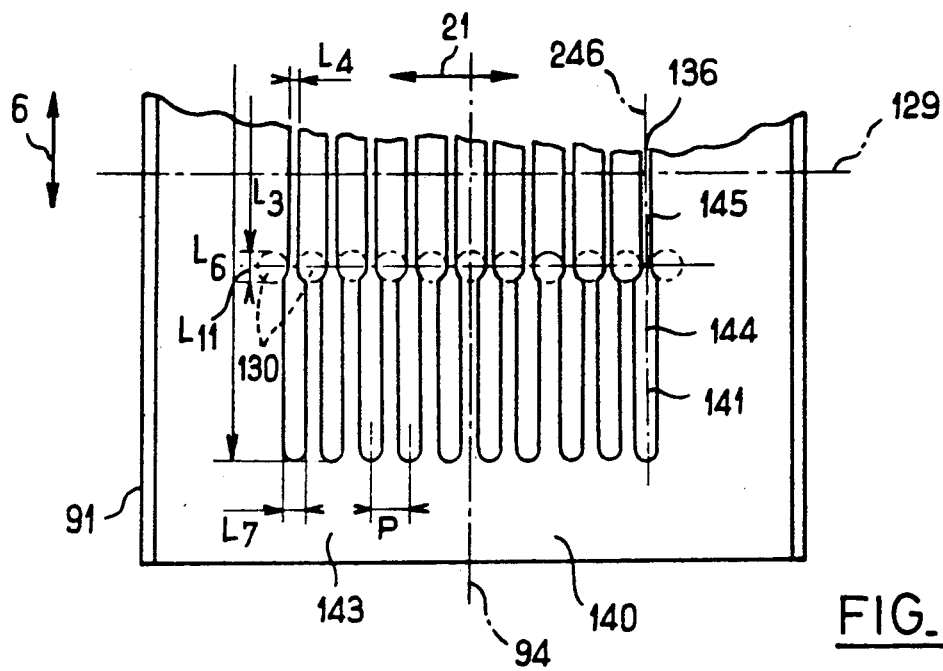
Figure 7:
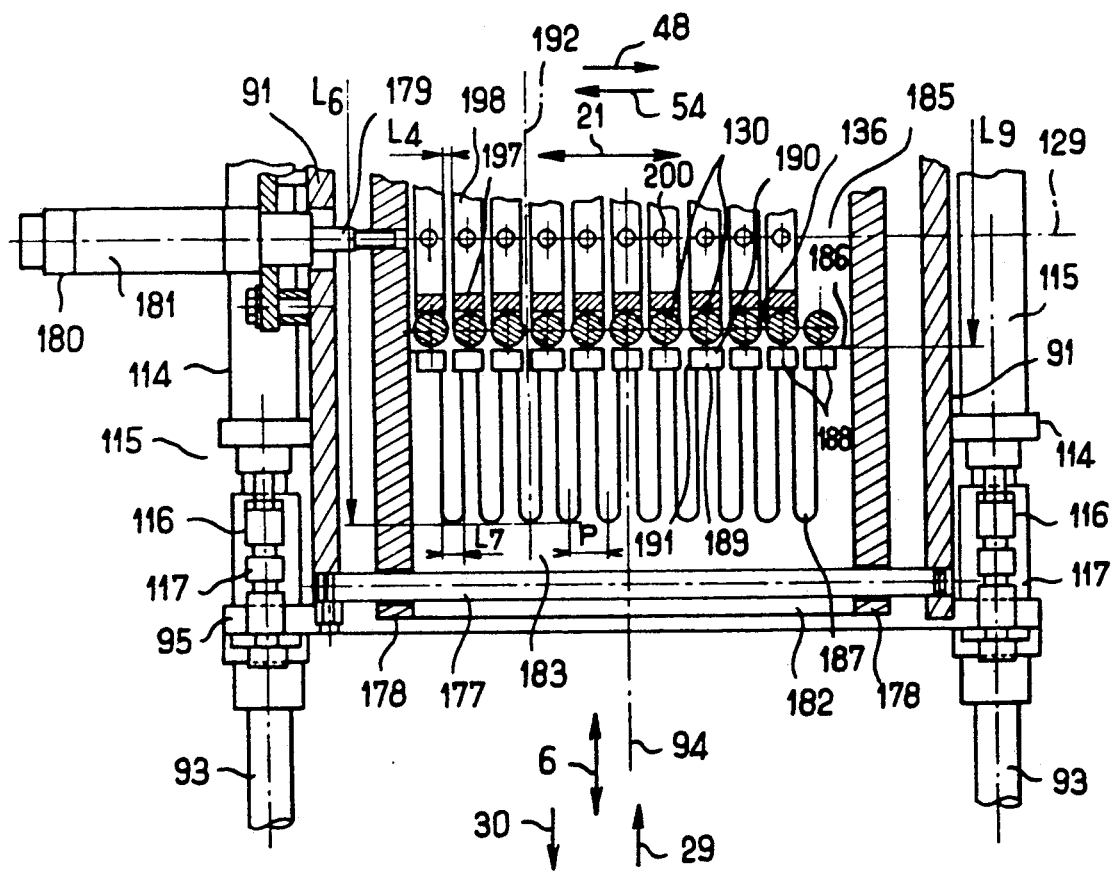

FIGS. 6 and 7 show production details of the apparatus according to the invention in section in horizontal planes designated respectively by VI—VI and VII—VII in FIG. 4.

FIG. 8 shows another detail, partially in section in a horizontal plane designated by VIII—VIII in FIG. 4.

FIG. 9 shows yet another detail, in section in a vertical plane designated by IX—IX in FIG. 4 and parallel to the plane designated by V—V in this figure.

FIG. 10 shows a plan view of the same detail in a direction designated by an arrow X in FIG. 9.

Figure 12:
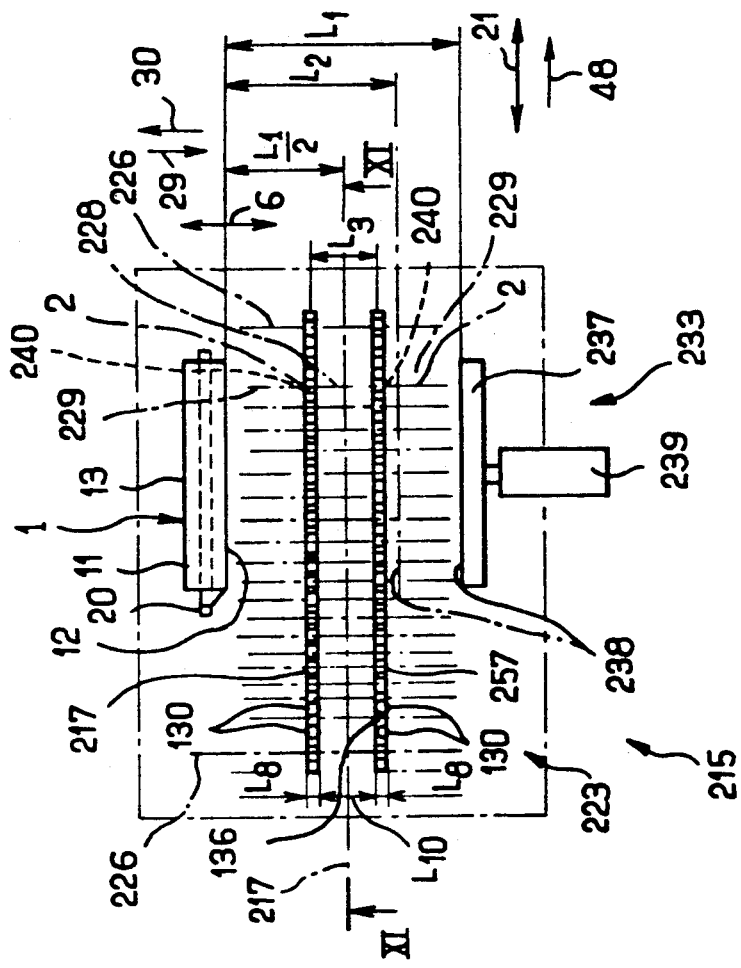
Figure 11:
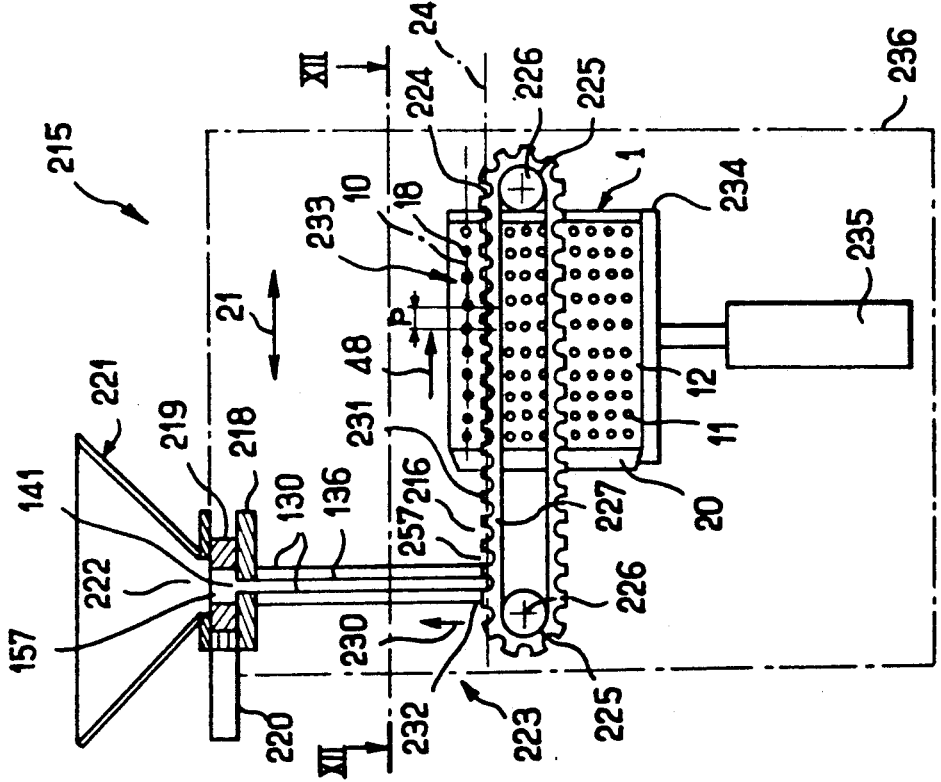

FIG. 11 illustrates diagrammatically an alternative embodiment of the apparatus shown in FIGS. 4 to 10, in section in a vertical plane designated by XI-XI in FIG. 12.

FIG. 12 shows a view of this alternative version in section in a horizontal plane designated by XII—XII in FIG. 11.

DETAILED DESCRIPTION OF THE INVENTION

Reference will first be made to FIGS. 1 to 3 which illustrate an apparatus 1 for the temporary retention of a plurality of skewers 2, for use as a loading apparatus of an automatic skewering machine (not shown) known per se; this apparatus 1 is of a type of which the characteristics and advantages are presented in French Patent Application No. 90 04579 filed on Apr. 10, 1990, but it goes without saying that a skewer distribution apparatus according to the invention could interact with other apparatuses for the temporary retention of a plurality of skewers or, more generally, other skewer reception apparatuses, for use as a loading apparatus of a skewering machine or for other uses.

It is known that the skewers 2 used for carrying out skewering on automatic skewering machines are generally made of wood and in the free state have, with wide tolerances, an approximately rectilinear shape, that is to say an approximately rectilinear mid-axis 3, an approximately specific length L along this mid-axis 3 and an approximately constant cross-section, for example approximately circular, of approximately specific diameter d perpendicularly to this mid-axis 3; however, each skewer 2 has two ends 4, 5 sharpened to a point.

The apparatus 1 is intended for receiving and retaining a plurality of skewers 2 in a specific relative position which they are to occupy in a skewering machine and in which their mid-axes 3 are arranged approximately in the same longitudinal direction 6, their ends 4 are arranged approximately in the same transverse plane 7 perpendicular to this longitudinal direction 6, and their ends 5 are arranged approximately in the same transverse plane 8 perpendicular to the longitudinal direction 6, whilst at least in a localized manner in the region of the apparatus 1 the axes 3 are arranged in mutually perpendicular rectilinear rows 9, 10, in which they are spaced from one another at the same interval p larger than the diameter d, for example of the order of four times this diameter d, this figure being given only as a non-limiting example.

For this purpose, the apparatus 1 comprises a body 11 having the general form of a right-angled parallelepiped delimited particularly by two plane main faces 12, 13 of identical shape, for example approximately square, connected to one another by means of four likewise plane end faces 14, 15, 16, 17 perpendicular two by two and to the main faces 12, 13; the main faces 12, 13 are transverse, that is to say perpendicular to the longitudinal direction 6, whilst the end faces 14, 15, 16, 17 are longitudinal, that is to say parallel to this longitudinal direction 6.

In parallel with this longitudinal direction 6, the body 11 is pierced right through, that is to say from its main face 12 to its main face 13, with a plurality of mutually identical rectilinear bores 18 having respective axes 19 parallel to the longitudinal direction 6, that is to say perpendicular to the main faces 12 and 13, and distributed according to the abovementioned rows 9, 10, in which they are spaced from one another at the abovementioned interval p; each of the rows 9 and 10 thus has 10 bores 18 in the example illustrated, on the understanding that this figure is only a non-limiting example and that the rows 9 and 10 can have any desired, possibly different, respective number of bores 18. The bores 18 are intended to allow a longitudinal sliding of respective skewers 2 in the body 11, at the same time providing longitudinal guidance for the skewers 2; for this purpose, in view of the tolerances in the shape and dimensions of these skewers 2 when these are made of wood, they have respective shapes rotational about their axes 19 with a minimum diameter $d_1$ slightly larger than the approximate diameter d of a skewer 2, for example of the order of 30% larger than this diameter d, and the longitudinal dimension 1 separating the faces 12 and 13 from one another is substantially smaller than the approximate length L of a skewer 2, for example of the order of one third or one quarter of this, these particulars being given only by way of non-limiting example. Each bore 18 can thus receive a respective skewer 2 with approximate coaxiality and with a possibility of relative longitudinal sliding.

However, means are provided for allowing such a relative longitudinal sliding, or, on the contrary, for opposing it, as required, and these means comprise a flat transverse slide 20 mounted slideably transversely relative to the body 11 in a specific transverse direction 21, that is to say perpendicular to the longitudinal direction 6; moreover, this direction 21 is parallel to the rows 10 and to the end faces 14 and 16 of the body 11, whilst it is perpendicular to the rows 9 and to the end faces 15 and 17 of the body 11.

For this purpose, the body 11 is pierced right through, in the direction 21, with a slideway 22 which opens into its end faces 15 and 17 and which possesses perpendicularly to the direction 21 a constant rectangular cross-section defined by four plane faces perpendicular two by two, namely two faces 23, 24 parallel to the end faces 14 and 16 and located opposite one another and two faces 25, 26 parallel to the main faces 12 and 13 and located opposite one another.

The faces 23 and 24 are located in the immediate vicinity of the end face 14 and the end face 16 respectively, whilst the faces 25 and 26 arranged on the same side of the slideway 22 as the main face 12 and the main face 13 respectively are as distant from these as possible, so that the slideway 22 subdivides each bore 18 into two portions 27, 28 possessing, in the longitudinal direction 6, a respective dimension $l_1$, $l_2$ as close as possible to half of 1, the corresponding dimension $l_3$ of the slideway 22 being comparatively small; thus, in the example illustrated, the dimension $l_1$ of that of the portions of each bore 18 which is located between the main face 12 and the face 25, namely the portion 27, is of the order of half of 1, whilst the corresponding dimension $l_2$ of the portion 28 located between the face 26 and the main face 13 is of the order of 2/5 of 1, and $l_3$ is of the order of 1/5 of 1; however, these proportions are only non-limiting examples, and other proportions could be adopted, without thereby departing from the scope of the present invention, provided that a substantial portion of each bore 18 remains respectively on either side of the slideway 22.

Each of the portions 27 and 28 of each bore 18 has a cylindrical shape rotational about the respective axis 19, with the abovementioned diameter $d_1$, over the major part of its respective dimension $l_1$, $l_2$, respectively from the face 25 (cylindrical zone 46 of the portion 27) and from the main face 13 of the body 11 (cylindrical zone 47 of the portion 28); however, respectively in the immediate vicinity of the main face 12 of the body 11 and in the immediate vicinity of the face 26, each of these portions 27 and 28 widens progressively in the form of a truncated cone rotational about the axis 19, respectively to a diameter $d_2$ much larger than the diameter $d_1$, for example of the order of 3 times $d_1$ (frustoconical zone 44 of the portion 27), and to a diameter $d_3$ intermediate between the diameters $d_1$ and $d_2$, for example of the order of twice $d_1$ (frustoconical zone 45 of the portion 28), these figures being given by way of non-limiting example. It will be seen that the two portions 27 and 28 of each bore 18 thus widen the same way 29 of the longitudinal direction 6, this way 29 being opposite to a way 30 forming a predetermined way of introduction of the skewers 2 into the bores 18 and of passage of the skewers 2 through the body 11.

To ensure its abovementioned guidance during sliding in the direction 21 in relation to the body 11, the slide 20 possesses perpendicularly to the direction 21 a cross-section closely complementary with that of the slideway 22, namely a rectangular cross-section defined by two plane main faces 31, 32 parallel to and spaced from one another by a dimension substantially equal to the dimension $l_3$ separating from one another the faces 25 and 26, with which these faces 31 and 32 are in respective sliding contact, and by two plane end faces 33 and 34 connecting these two main faces 31 and 32 to one another and arranged perpendicularly to these and parallel to one another, being spaced from one another at a distance $l_4$ substantially identical to the distance separating from one another the two faces 24 and 23, with which they are in respective sliding contact. In parallel with the direction 21, the slide 20 has a dimension $l_5$ larger than the corresponding dimension $l_6$ of the body 11, that is to say than the dimension separating the end faces 15 and 17 of the latter from one another, in such a way that the slide 20 forms a projection 35, 36 from the slide 20 in the direction 21 respectively in relation to the end face 15 and in relation to the end face 17; in the region of its projection 35 in relation to the end face 15, the slide 20 is delimited between the main faces 31 and 32 by a plane end face 37 perpendicular to the main faces 31 and 32 and to the faces 33 and 34, that is to say also to the direction 21; on the same side as the projection 36, it is partially delimited by a plane end face 38 parallel to the end face 37, this end face 38 being connected respectively to the end face 33 and the end face 34 by means of likewise plane end faces 39, 40 perpendicular to the main faces 31 and 32, but oriented at 45° relative to the end face 38 and relative to the end face 33 or 34 respectively, in such a way that, in the region of its projection 36, the slide 20 narrows progressively towards the outside of the body 11, if it is seen in the region of either one of its main faces 31 and 32 or between these. In particular, the projections 35 and 36 allow the slide 20 to be operated so that it slides in the direction 21 in relation to the body 11, the projection 36 carrying, furthermore, means 41 for locking the slide 20 in a predetermined relative position in relation to the body 11, as required, as will appear later.

To allow the skewers 2 to pass through the body 11 via the bores 18 of the latter, the slide 20 is pierced right through, along respective axes 42 perpendicular to its main faces 31 and 32, with as many holes 43 as there are bores 18 of the body 11.

Each of these holes 43 has a cylindrical shape rotational about its respective axis 42 with a diameter substantially equal to the diameter $d_3$, and the axes 42 of the various holes 43 occupy relative to one another and relative to the end faces 33 and 34 of the slide 20 positions identical to those which the axes 19 of the bores 18 occupy relative to one another and relative to the faces 23 and 24 of the slideway 22 of the body 11, in such a way that, as a result of a sliding of the slide 20 relative to the body 11 in the direction 21, the slide 20 can, in particular, be placed in two predetermined positions, namely:

a first position, illustrated in FIGS. 1 and 2, in which each axis 42 coincides with a respective axis 19, with the result that, with reference to the way 30, each hole 43 forms a broadening downstream of the portion 27 of the corresponding bore 18, the portion 28 of which corresponds to a downstream narrowing of this hole 43, the frustoconical zone 45 ensuring that this narrowing has progression the way 30; this first relative position allows a free sliding of each skewer 2 within the corresponding bore 18 and corresponding hole 43;

a second position, illustrated in FIG. 3, in which each axis 42 is offset the same way 48 of the direction 21 going from the end faces 15 and 37 towards the end faces 17 and 38, in relation to the axis 19 of the corresponding bore 18, at a distance $l_7$ substantially equal to half the difference between the diameters $d_3$ and $d_2$, in such a way that each hole 43 takes its place in the direct extension of the cylindrical zone 46 of the portion 27 of the respectively corresponding bore 18, on a side of the hole 43 and of this bore 18 located upstream with reference to the way 48; however, this value of $l_7$ is only a non-limiting example, provided that each hole 45 of the slide 20 occupying this second position remains partially in register with the corresponding bore 18 of the body 11 under conditions suitable for allowing the mode of operation which will now be described.

So that this second position of the slide 20 in relation to the body 11 becomes a position immobilizing the skewers 2 within the bores 18, the slide 20 possesses fixedly, on the inside of each of the holes 43, a buffer 49 made of a material which is elastically compressible and/or has a high coefficient of friction, such as a rubber or similar material, this buffer 49 forming a projection within the respectively corresponding hole 43 towards the axis 42 of the latter, on the side of this hole 43 located upstream with reference to the way 48; for example, as illustrated, the buffer 49 possesses, towards the axis 42 of the respectively corresponding hole 43, a plane face 50 oriented perpendicularly to the direction 21, this face 50 being spaced from the axis 42 of the respectively corresponding hole 43 in the direction 21 at a distance $l_8$ greater than the difference between the diameters $d_1$ and d and preferably only slightly greater than this difference, whilst remaining smaller than $d_1$, in such a way that, in the abovementioned second position of the slide 20 in relation to the body 11, each buffer 49 comes to bear with its face 50 under slight deformation on a portion 51 of a respective skewer 2 engaged in the hole 43 in question by means of this portion 51, whilst this skewer 2 bears the way 48 against respective zones 46 and 47 of the portions 27 and 28 of the bore 18 by means of a respective portion 52, 53, in a manner distributed approximately equally on either side of the slide 20, without these bearings offset in the longitudinal direction 6 resulting in any deformation of or damage to the skewer 2 in question It will be seen that, in the first of the abovementioned positions of the slide 20 in relation to the body 11, each buffer 49 is retracted completely the way 54 opposite the way 48 in relation to the portions 27 and 28 of the corresponding bore 18.

The buffers 49 can have various embodiments and, in particular, can be omitted if the slide 20 is itself produced from a material suitable for ensuring that the skewers 2 are immobilized against a longitudinal sliding relative to the body 11, without the risk of damage to the skewers 2, when the slide 20 occupies the second of the abovementioned positions in relation to the body 11; in the example illustrated, the buffers 49 of each row 55 of holes 43 corresponding to the same row 9 of bores 18 of the body 11 consist of the same respective strip 56 of a suitable material, such as rubber or similar material, retained fixedly by pinching and/or adhesive bonding in a respective rebate 57 which the slide 20 possesses in an intermediate position between its main faces 31 and 32, in such a way that, even in the state greatly compressed as a result of contact with a skewer 2, each buffer 49 cannot come into contact with one of the faces 25 and 26 of the slideway 22, at the risk of impeding the sliding of the slide 20 in relation to the body 11 in the direction 21; in the example illustrated, each strip 56 and the corresponding rebate 57 have a rectangular cross-section perpendicularly to the corresponding row 55 of holes 43, as shown in FIG. 3, but the shape of this cross-section could also be different; in particular, in a way which is not shown, but which can easily be imagined by an average person skilled in the art, the cross-section of each strip 56 could be semicircular, or each strip 56 could consist of a juxtaposition in the direction 21, within the corresponding rebate 57, of two bolsters of respective circular cross-section maintained under compressive prestress; the arrangement of the rebates 57 and the insertion of the strips 56 in these can be made easier if, as illustrated, the slide 20 is formed from the mutually fixed superposition of two plates 58, 59, in one of which a bottom and one flank of each rebate 57 are machined and the other of which defines another flank of each rebate 57 in a manner easily understandable to an average person skilled in the art who will also easily understand that the body 11 is itself preferably formed from the mutually fixed superposition of two plates 60 and 61, one of which defines the faces 23, 24, 26 of the slideway 2 by means of suitable machining, whilst the other plate defines the face 25 of the slideway 22.

To stabilize the slide 20 in relation to the body 11 in the first of the abovementioned positions, that is to say in the position corresponding to the coaxiality of the holes 43 with the bores 18, the slide 20 carries fixedly, in the region of its projection 36, means for stopping the way 54 in relation to the body 11; in the example illustrated, these stop means take the form of two dogs 62 which the slide 20 carries fixedly on its main face 31 and which butt against the end face 17 of the body 11 the way 54 when the axes 42 of the holes 43 coincide with the axes 19 of the bores 18.

Furthermore, there are means for the elastic return of the slide 20 towards this mutual stop position of the dogs 62 and of the end face 17 of the slide 20, the way 54, in the form of a helical compression spring 63 arranged in the direction 21 in a mid-position between the two end faces 14 and 16 of the body 11 and between the two end faces 33 and 34 of the slide 20, within an aperture 64 passing right through the slide 20 in the region of its projection 36 in parallel with the axes 42 of its holes 43.

For this purpose, the aperture 64, delimited respectively the way 54 and the way 48 by mutually parallel plane faces 65, 66 perpendicular to the direction 21 and to the faces 31 and 32 which they connect, whilst otherwise delimited by two mutually parallel likewise plane faces 67, 68, likewise parallel to the direction 21, whilst being perpendicular to the faces 31 and 32 which they connect, possesses, in its face 65, a blind hole 68 of an axis 69 parallel to the direction 21 and equidistant from the end faces 33 and 34 of the slide 20 on the one hand and from the main faces 31 and 32 of the latter on the other hand, in order to receive the spring 68 at an end of the latter not bearing a reference numeral. The face 65 of the aperture 64 is flush with the end face 17 of the body 11 when the slide 20 occupies relative to this its position of coaxility of the holes 43 with the bores 18, and the body 11 carries fixedly by this end face 17, projecting relative to this the way 48 between the face 25 and the main face 12, a piece 70 serving as a mounting intermediary for the abovementioned locking means 41, this piece 70 possessing, projecting inside the aperture 64 of the slide 20 opposite the slideway 22 the way 48, but at a distance l$_8$ from the end face 17 greater than l$_7$, an extension 71 pierced directly opposite the blind hole 68, along the same axis 69, with a blind hole 72 receiving the spring 68 at its second end.

Thus, the spring 68 bearing under prestress, on the one hand, in the blind hole 68 of the face 65 of the aperture 64 of the slide 20 and, on the other hand, in the blind hole 72 of the extension 71 of the intermediate mounting piece 70 the way 54 and the way 48 respectively permanently stresses the slide 20 the way 54, so as to bring it with the dogs 62 up against the end face 17 of the body 11 if nothing opposes this, particularly if the locking means 41 do not retain the slide 20 in its position of mutual misalignment of the holes 45 and of the bores 18, corresponding to the immobilization of the skewers 2 in relation to the apparatus 1.

For this purpose, the locking means 41 comprise a yoke 73 partially penetrating into the aperture 64 of the slide 20 and articulated on the intermediate mounting piece 70 about an axis 74 oriented perpendicularly to the end faces 14 and 16 of the body 1 and located approximately in the geometrical plane, not bearing any reference numeral, of the face 25 between the end face 17 of the body 11 and the face 66 of the aperture 64, whatever the position occupied by the said slide 20 in relation to the body 11 under the normal conditions of use of the apparatus 1, that is to say particularly in either one of the two abovementioned positions and in any intermediate position between these occurring as a result of a sliding of the slide 20 in the direction 21 in relation to the body 11.

Between the axis 74 and the face 66 of the aperture 64, the yoke 73 has a flat web 75 located opposite a plane face 76, perpendicular to the direction 21 and delimiting the intermediate mounting piece 70 in the direction moving away from the end face 17 of the body 11 the way 48, but set back relative to the face 66 of the aperture 64 the way 54; in a locking position of the slide 20 in the said second position of the latter, corresponding to a misalignment of the holes 43 relative to the bores 18, as shown in FIG. 3, the flat web 75 of the yoke 73 is substantially parallel to the face 76 of the intermediate mounting piece 70, in relation to which this web 75 is offset the way 48, whilst in the position of coaxiality of the holes 43 and of the bores 18 illustrated in FIG. 2, the flat web 75 converges relative to the face 76 the way 29 as a result of a relative pivoting about the axis 74.

A helical spring 77 held under compressive prestress between a blind hole 78 arranged in the face 76 of the intermediate mounting piece 70 along an axis 79, located in the direction 21 midway between the end faces 14 and 16 of the body 11, and a blind hole 80 placed opposite this blind hole 78 along the axis 79 of the latter and arranged in the web 75 along an axis 81 coinciding with the axis 79 in the orientation illustrated in FIG. 3 returns the yoke 73 permanently towards this orientation illustrated in FIG. 3.

However, this tendency is opposed by a butting of the yoke 73 against the slide 20 by means of two stop tabs 82 which the yoke 73 carries fixedly, projecting from its web 75 in the direction going away from the axis 74, respectively in the vicinity of the face 67 of the aperture 64 and in the vicinity of the face 68 of the latter, but opposite and partially within this aperture 64.

Referring to the position which the yoke 73 occupies when it ensures the locking of the slide 20 relative to the body 11 in a relative position of mutual misalignment of the holes 43 and of the bores 18, as shown in FIG. 3, each of the stop tabs 82 possesses, in the direction going away from the axis 74, a step 83 delimited by two plane faces 84, 85 arranged at right angles relative to one another; the face 84 parallel to the axis 73 is therefore oriented parallel to the face 76 of the intermediate mounting piece 70 and oriented in the same way as this face 76, that is to say in the direction going radially away from the axis 73, and it is located at a distance l$_9$ from this axis 73 corresponding to the distance separating the face 66 of the aperture 64 of the slide 20 from this axis, in such a way that the face 84 of the step 83 is, when flat, put in contact with a zone of this face 66 adjacent to the main face 31 of the slide 20 and thus prevents the latter from reaching its position of coaxiality of the holes 43 with the bores 18 under the action of the spring 63 by sliding the way 54 in relation to the body 11; the face 85 is itself then coplanar with the face 25 and oriented in the same way as this, being located further from the axis 73 than the face 84, so as, when flat, to bear against a zone of the main face 31 of the slide 20 directly adjacent to the face 66 of the aperture 64 of the latter under the action of the spring 77 which tends to maintain this contact.

The face 84 of the step 83 is connected to the web 75 of the yoke 73 by means of a plane face 86 oriented in the same manner as the face 85, but offset relative to this at a distance $l_{10}$ such that, if the yoke 73 is tilted manually about the axis 74 counter to the axis of the spring 77 until the web 75 makes contact with the face 76 of the intermediate mounting piece 70, as shown in FIG. 3, a way corresponding to a movement of the face 85 of the step 83 away from the main face 31 of the slide 20, the face 66 of the aperture 64 escapes from the face 84 of the step 83, and such that the slide 20 can reach its position of coaxiality of the holes 43 and of the bores 18 by sliding the way 54 in relation to the body 11 under the action of the spring 63; then, under the action of the spring 77, the yoke 73 bears with the faces 86 of the stop tabs 82 against a junction edge 87 between the face 66 of the aperture 64 and the main face 31 of the slide 20.

Subsequently, if the slide 20 is stressed the way 48 in relation to the body 11 until the face 86 of the stop tabs 82 escapes from the edge 87, the yoke 73 stressed by the spring 77 regains its position illustrated in FIG. 3, in which it locks the slide 20 relative to the body 11. It will be seen that a space 250 then still remains in the direction 21 between the face 65 of the aperture 64 of the slide and the outside 71 of the piece 70, with the result that a deliberate movement of the slide 20 in relation to the body 11 the way 48 still remains possible over a sufficient stroke to allow the abovementioned mutual locking and unlocking movements of the slide 20 and of the body 11 as a result of the pivoting of the yoke 73 about the axis 74 in relation to the piece 70.

It is thus certain that the skewers 2 introduced into the bores 18 of the body 11 and the holes 43 of the slide 20 remain immobilized in relation to the apparatus 1, until, as a result of a deliberate unlocking action on the yoke 73, the holes 43 and the bores 18 are restored to coaxiality in order to release the skewers 2 once again.

The apparatus just described can have various accessory arrangements making it easier to handle it and to operate the yoke 73 in the unlocking direction, such as, for example, suitable reliefs of the end faces 14 and 16 of the body 11 and of the yoke 73, in a way not shown, but easily understandable to an average person skilled in the art, and to mount it in an exact positioning on an apparatus for distributing skewers in the various bores 18 of the body 11 and holes 43 of the slide 20 and/or on a machine, such as a skewering machine, intended to be loaded by means of the apparatus 1.

By way of non-limiting example, there are illustrated as means for positioning the apparatus 1 on a skewering machine studs 89 fixed to the body 11 and forming a projection on the main face 13 of the latter so as to penetrate into recesses provided in a complementary manner on a skewering machine (not shown); these studs 89, of which there are, for example, 4, occupy predetermined positions on the face 13 in relation to the positions of the recesses of the skewering machine; as a nonlimiting example of means for positioning the apparatus 1 in relation to a skewer distribution apparatus, there are illustrated two rectilinear ribs 88 projecting respectively on the end faces 15 and 17 of the body 11 along the junction of these end faces 15 and 17 with the main face 13 of the body 11, each of these ribs 88, thus arranged parallel to one another perpendicularly to the longitudinal direction 6 and to the transverse direction 21, being capable of interacting with a respective slideway of a skewer distribution apparatus 2.

Specifically, the apparatus according to the invention which will now be described with reference to FIGS. 4 to 10 and to FIGS. 11 and 12 has such slideways for receiving the ribs 88 of the body 11 of the apparatus 1 just described.

Reference will first be made to FIGS. 4 to 10 which illustrate an apparatus 90 according to the invention capable of ensuring, in a single operation, the loading of skewers 2 into all the bores 18 and corresponding holes 43 of the apparatus 1 just described, whilst the latter is retained in a position in which it is represented diagrammatically by dot-and-dash lines in FIG. 4, namely a position in which the longitudinal direction 6 and transverse direction 21 are horizontal, as are the end faces 14 and 16 of the body 11, the end face 14 being turned downwards, whilst the main faces 12 and 13 of the body 11 and the end faces 15 and 17 of the latter and the ribs 88 carried by these are arranged vertically; the axes 19 of the bores 18 of the same row 9 are thus arranged in the same respective vertical plane 244, and the rows 9 of bores 18 as well as the end faces 15 and 17 and the ribs 88 of these respectively are symmetrical to one another in relation to a vertical mid-plane 94 of the apparatus 90, this vertical mid-plane 94 thus being longitudinal with reference to the longitudinal direction 6 and constituting a general plane of symmetry for the apparatus 90.

For this purpose, the apparatus 90 possesses fixed to a stand 91 stationary relative to the ground 92, two horizontal rectilinear rails 93 arranged in the same direction, which will be understood as coinciding with the longitudinal direction 6, and symmetrically relative to one another in relation to the vertical mid-plane 94 of the apparatus 90, and these two rails 93 carry, with a possibility of relative sliding in the longitudinal direction 6, a carriage 95 possessing fixedly, above the rails 93, two vertical slideways 96 symmetrical to one another in relation to the plane 94 and having in any horizontal sectional plane a cross-section in the form of a U open towards this plane 94, in order respectively to receive one of the ribs 88 and the other, with a possibility of relative vertical sliding, as indicated diagrammatically in FIGS. 2 and 3; furthermore, the carriage 95 carries fixedly between the slideways 96 and the rails 93 a bracket 97 possessing upwardly a horizontal plane face 98 serving as a downward support for the end face 14 of the body 11 of the apparatus 1.

In a manner which an average person skilled in the art can easily imagine, the carriage 95 is of such a shape that at least the main face 12 of the body 11 of the apparatus 1 remains completely disengaged in a longitudinal direction 6, at least opposite the bores 18 in this direction.

Preferably, the carriage 95 also carries means 99 for the automatic operation of the means 41 for locking the slide 20 of the apparatus 1 in relation to the body 11 of the latter, for example in the form more particularly illustrated in FIGS. 9 and 10.

In this embodiment of the means 99, these comprise on the carriage 95, on the same side of the latter as that of the slideways 96 receiving the rib 88 of the end face 17 of the body 11, a bearing 100 for guiding a shaft 101 in rotation about a horizontal axis 102 arranged in the longitudinal direction 6 at a level above that of the face 98 of the bracket 97, but at a distance $l_{12}$ from this face 98 smaller than half the distance $l_{11}$ separating the end faces 14 and 16 of the body 11 of the apparatus 1 from one another; the bearing 100 and the shaft 101 are located further from the plane 94 than the slideways 96, in order to avoid obstructing the engagement of the apparatus 1 between these.

At one end adjacent to the slideway 96 located on the same side of the plane 94 as the bearing 100, the shaft 101 carries fixedly an arm 103 radial relative to the axis 102 and itself carrying in relative rotation about an axis 104 parallel to the axis 102, but offset upwards in relation to this, a roller 105 thus placed in relation to the face 98 of the bracket 97 at a level $l_{13}$ corresponding approximately to half of $l_{11}$ under the normal operating conditions of the means 99, at a distance from the plane 94 which can vary as a function of the orientation of the arm 103 about the axis 102; with reference to the longitudinal direction 6 and assuming an apparatus 1 engaged with its ribs 88 in the slideways 96 and resting by the end face 14 of the body 11 on the face 98 of the slideway 97, the roller 105 is located directly opposite the end face 37 of the slide 11 in the transverse direction 21.

At its other end located on the other side of the bearing 100, the shaft 101 carries fixedly another arm 106 oriented radially relative to the axis 102, but located below this, in contrast to the arm 103, and this arm 106 is articulated about an axis 107 parallel to the axes 102 and 104 and located opposite the axis 104 in relation to the axis 102, in practice in a plane 108 approximately vertical under the normal operating conditions of the means 99 and also including the axes 102 and 104, on a rod 109 of an approximately horizontal jack 110 possessing. moreover, a body 111 articulated on the carriage 95 about an axis 112 parallel to the axes 102, 104, 107 and offset relative to the axis 102.

Under the action of the jack 110, the roller 105 can thus occupy two limiting positions, one of which is illustrated in FIGS. 9 and 10, and any intermediate position between these two limiting positions, as a result of the joint rotation of the arms 103 and 106 about the axis 102.

In its position illustrated in FIGS. 9 and 10, the roller 105 is capable of coming in contact with the face 37 of the slide 20 in the region of the projection 35 of the latter from the body 11 of the apparatus 1, when the slide 20 occupies its position of coaxiality of the holes 43 with the bores 18 in relation to this body 11; in its other limiting position, not illustrated in FIGS. 9 and 10, the roller 105 is comparatively nearer to the plane 94, so as to push the slide 20 the way 48 in relation to the body 11 sufficiently for the locking means 41 to ensure its locking relative to the body 11 in the position, illustrated in FIG. 3, of relative misalignment of the holes 43 and of the bores 18 and of retention of the skewers 2 in relation to the apparatus 1; for this purpose, the jack 110 is controlled automatically as a function of the operating cycle of the apparatus 90, which will be described later, by automatic control means 245, the production of which is within the normal abilities of an average person skilled in the art and which therefore will not be described in any more detail.

Likewise under automatic control by the means 245 as a function of the operating cycle of the machine, the carriage 95 carrying the apparatus 1 can be displaced along the rails 93 between a position receiving skewers 2 in the bores 18 via the face 12 of the body 11 and a position comparatively offset the way 30, forming a position for substituting an apparatus 1 to be equipped with skewers 2 for an apparatus 1 previously equipped with such skewers; these positions are represented respectively by unbroken lines and by dot-and-dash lines in FIG. 4.

In the position for receiving skewers, the apparatus 1 has its face 12 directly opposite, in a longitudinal direction 6, a location 113 for longitudinal transfer the way 30 simultaneously towards each of the bores 18 of each row 9, when the slide 40 occupies its position of coaxiality of the holes 43 with the bores 18, of a respective skewer 2 oriented longitudinally with some degree of approximation associated with its possible natural bending.

The displacement of the carriage 95 along the rails 93 between its skewer-receiving position and its position for substituting an apparatus 1 to be equipped with skewers for an apparatus 1 equipped with skewers can be brought about by any suitable means, for example by a pair of jacks 114 which are arranged in positions symmetrical to one another in relation to the plane 94 respectively on either side of the transfer location 113 and are controlled in synchronism by the means 245 and each of which comprises a body 115 fixed to the stand 91 and oriented in the longitudinal direction 6 and a rod 116 connected fixedly to the carriage 95 with a possibility of longitudinal adjustment by any suitable means, for example of the screw/nut type, shown diagrammatically at 117.

Opposite the transfer location 113 in the longitudinal direction 6 in relation to the apparatus 1, with reference to the skewer-receiving position, the stand 91 carries movably in the longitudinal direction 6 a transverse pushplate 118 possessing towards the transfer location 13, that is to say opposite the face 12 of the apparatus 1, a vertical plane face 119 perpendicular to the longitudinal direction 6; this face 119 is approximately square, when seen the way 29, and forms a mirror image of the main face 12 of the body 11 of the apparatus 1; it is thus delimited particularly by two mutually parallel horizontal rectilinear edges 120, 121 vertically distant from one another by $l_{11}$ and located respectively level with the end face 14 and with the end face 16 of the body 11 of the apparatus 1 placed on the carriage 95, and two vertical rectilinear edges 122, 123 located at the same distance equal to half of $l_6$ from the plane 94 as the end faces 15 and 17 of the body 11 of the apparatus 1 and thus arranged symmetrically relative to one another in relation to the plane 94.

The plate 118 is connected to the stand 91 of the apparatus 90, on the one hand, by means of two mutually parallel rectilinear rods 124 arranged symmetrically relative to one another in relation to the plane 94 in the longitudinal direction 6 and guided slideably in this direction in bearings 125 carried fixedly by the stand 91 opposite the transfer location 113 in relation to the plate 118, and, on the other hand, by means of a jack 126 likewise located opposite the plate 118 in relation to the transfer location 113 and comprising a body 127 fixed to the stand 91 in an orientation parallel to the longitudinal direction 6 along the plane 94 and a rod 128 fixed to the plate 118; in practice, therefore, the jack 126 is located between the two rods 124 or between the two sliding bearings 125.

By the action of the jack 126 under the control of the means 245 as a function of the operating cycle of the apparatus 90 which will be described later, the plate 118 can be put in its position represented by unbroken lines in FIGS. 4 and 8; in this position, its face 119 is distant from the main face 12 of the body 11 of the apparatus 1 placed by the carriage 95 in the skewer-receiving position, in the longitudinal direction 6, at a distance $L_1$ greater by a few millimeters than the length L of the skewers 2 in a manner equally distributed on either side of a vertical plane 129 oriented perpendicularly to the plane 94 and constituting a general plane of symmetry for some components of the apparatus 90, particularly the transfer location 113. By the action of the jack 126, the plate 118 can also be brought into a position nearer to the main face 12 of the body 11 of the apparatus 1 placed by the carriage 95 in the skewer-receiving position, whilst nevertheless remaining offset relative to the plane 129 opposite the latter in relation to the apparatus 1; for example, the face 119 is then distant from the face 12 of the apparatus 1 placed by the carriage 95 in the skewer-receiving position at a distance $L_2$ corresponding to the difference between the length L of a skewer and the dimension 1 separating the main faces 12 and 13 of the body 11 of the apparatus 1 from one another, with the possibility of adapting this dimension $L_2$ as a function of various lengths L of skewers by adjusting the jack 126 or limit detectors (not shown) associated with the latter; the two abovementioned positions of the plate 118 or of its face 119 constitute limiting positions, between which the plate 118 moves under the action of the jack 126 in the longitudinal direction 6.

Between the face 119 of the pushplate 18, whichever of the two abovementioned limiting positions the latter occupies, and the face 12 of the apparatus 1 placed by the carriage 95 in the skewer-receiving position, the stand 91 carries fixedly, in the region of the transfer location 113, a plurality of pairs of vertical columns 130 symmetrical relative to one another in relation to the plane 129, the number of these pairs of columns 130 being greater by one unit than the number of rows 9 of bores 18 of the body 11 of the apparatus 1; the apparatus 90 illustrated thus has 11 pairs of columns 130, this number being given as a non-limiting example. These columns 130 are equidistant from the plane 129, and two columns 130 of the same pair are spaced from one another perpendicularly to this at a distance $L_3$ of the order of one third to three quarters of the length L of a skewer 2; perpendicularly to the plane 129, each column 130 has a dimension $L_{11}$ small in relation to $L_3$, for example of the order of one quarter of $L_3$; the values of the dimensions $L_1$, $L_2$, $L_3$, $L_{11}$ and 1 given by way of nonlimited example are selected in such a way that, even when the plate 18 occupies its position represented by dot-and-dash lines in which its face 119 is nearest to the plane 129, it remains more distant from this plane 129 than the columns 130.

Moreover, each pair of columns 130 symmetrical relative to one another in relation to the plane 129 is, in the longitudinal direction 6, located opposite a band 131 of the main face 12 of the apparatus 1 located between two rows 9 of bores 18 of the body 11 of the latter, when the apparatus 1 is placed by the carriage 95 in the skewer-receiving position, in such a way that between two adjacent pairs of columns 30 there remains, opposite a respective row 9 in the longitudinal direction 6, a continuous vertical passage 132 symmetrical in relation to the corresponding plane 244 and possessing in the transverse direction 21, then arranged horizontally, a dimension $L_4$ larger by a few tenths of a millimeter than the diameter d of a skewer 2. The passages 132 and the pairs of columns 130 therefore adhere, in the transverse direction 21, to the interval p separating the rows 9 of bores 18 of the body 11 of the apparatus 1 from one another.

The passages 132 thus extend vertically over the entire vertical dimension of the transfer location 113, that is to say from the same level 133 slightly below that of the edge 120 of the face 119 of the plate 118 and of the face 98 of the bracket 97 to a level 134 slightly above that of the edge 121 of the face 119 of the push-plate 118, over a height $H_1$ slightly greater than the dimension $l_{11}$ of the body 11 of the apparatus 1.

In contrast, the columns 130 are extended vertically above the level 134 over the height $H_2$ likewise slightly greater than $l_{11}$, to a level 135 at which they are connected fixedly to a horizontal plate 136, itself fixed to the stand 91 of the apparatus 90.

Between the levels 134 and 135, the mutually adjacent pairs of two columns 130 symmetrical relative to one another in relation to the plane 129 delimit between them three vertical passages 136, each of which is symmetrical relative to a respective vertical plane 246 perpendicular to the transverse direction 21 and possesses substantially the same dimension $L_4$ in the direction 21 as the passages 130; like these, the passages 136 are arranged at the interval p in a number identical to that of the rows 9 of bores 18 of the body 11 of the apparatus 1.

However, each passage 136 is offset relative to the passage 132 delimited by the same adjacent pairs of two columns 130 symmetrical relative to one another in relation to the plane 129, the same way of the direction 21, for example the way 48, at the same distance $L_5$ which is greater than half the diameter d of a skewer 2 and, for example, equal to $L_4$.

At the level 134, each passage 136 is connected continuously to a corresponding passage 132, that is to say that delimited by the same adjacent pairs of two columns 130 symmetrical relative to one another in relation to the plane 129, by means of a respective horizontal passage 137 oriented in the transverse direction 21 and having a height substantially equal to $L_4$, between a pair of horizontal shoulders 138 mutually coplanar at the level 134 and arranged on the columns 130 of the pair of columns delimiting in the downstream direction, with reference to the way 48, the passages 136 and 132 in question, these shoulders 138 facing upwards in order to close the passage 136 locally downwards, that is to say to open it only towards the passage 137 the way 54 opposite the way 48, and mutually coplanar horizontal shoulders 139 facing downwards and located at a distance $L_4$ above the level 134, these shoulders 139 being arranged on the two columns 130 of the pair of columns delimiting in the upstream direction, with reference to the way 48, the passages 136 and 132 in question.

Perpendicularly to the plane 129, each of the passages 136, which is in fact defined only by two mutually adjacent pairs of columns 130 symmetrical relative to one another in relation to the plane 129, has a dimension, not designated by a reference numeral, much greater than the length L of a brochette 2, in a manner equally distributed on either side of the plane 129.

Upwards, at the level 135, each of the passages 136 opens into a respective slot 141 of the plate 140.

Each slot 141 passes vertically right through the plate 140, that is to say from a plane horizontal lower face 142 of the latter to a likewise plane horizontal upper face 143 of this plate 140, and has a symmetry on the one hand relative to the plane 129 and on the other hand relative to the plane of symmetry 246 of the corresponding passage 136.

As shown more particularly in FIG. 6, each of the slots 141 has an elongate shape in the longitudinal direction 6, in which it has a dimension $L_6$ larger than the length L of skewer 2.

The slots 141 are identical, and each of them has, in the longitudinal direction 6, three portions, namely two end portions 144 and an intermediate portion 145 between these two end portions 144. In the longitudinal direction 6, the intermediate portion 145 extends over the dimension $L_3$ plus double the dimension $L_{11}$ symmetrically in relation to the plane 129; in other words, it mutually connects the columns 130 symmetrical relative to one another in relation to the plane 129 delimiting the corresponding passage 136; in the transverse direction 21, it has the dimension $L_4$ separating from one another two mutually adjacent pairs of columns 130 symmetrical relative to one another in relation to the plane 94. The end portions 144 are widened comparatively in the transverse direction 121 both ways 48 and 54 of the latter and in this direction 21 have a dimension $L_7$ larger than $L_4$, although smaller than the interval p at which the slots 141, like the passages 136 and the passages 130, are spaced from one another in the transverse direction 21.

In a manner not shown, it is also possible for the intermediate portion 145 of each slot 141 to have, in the transverse direction 21, a dimension larger than the dimension $L_4$, although remaining smaller than double the diameter d of a skewer 2, and smaller than the dimension $L_7$, itself smaller than the interval p, to make it easier for especially deformed skewers 2 to pass through.

Mounted immediately above the face 143 of the plate 140 in translational movement on the latter and in relation to the stand 91 of the apparatus 90 in the direction 21 is a flat horizontal slide 146 having particularly a plane horizontal lower face 147 located directly opposite the upper face 143 of the plate 140 and in sliding contact with this face 141, a plane horizontal upper face 148 and four plane vertical end faces perpendicular two by two as two end faces 149, 150 oriented perpendicularly to the longitudinal direction 6 and two end faces 151 and 152 oriented perpendicularly to the transverse direction 21; the two end faces 149 and 150 are spaced from one another in the longitudinal direction 6 by a dimension, not bearing a reference numeral, much larger than the length L of a skewer 2, whilst the faces 151 and 152 are spaced from one another in the direction 21 by a dimension, not bearing a reference numeral, of the same order as the dimension $l_6$ of the body 11 of the apparatus 1 or larger than this dimension $l_6$.

In the immediate vicinity of its two end faces 149 and 150, the slide 146 is mounted slideably in the direction 21 in relation to the stand 91 on rectilinear rails 153 which are oriented in the direction 21 and which the stand 91 carries fixedly A jack 154 likewise arranged in the transverse direction 21 along the plane 129 is fixed by means of its body 155 to the stand 91 of the machine and by means of its rod 156 to the slide 146 via the end face 151 of the latter and makes it possible, when the apparatus 90 is in operation, to drive the slide 146 permanently in a to-and-fro movement in the transverse direction 21, with an amplitude at most equal to the interval p and preferably smaller than this.

Vertically between its faces 147 and 148, the slide 146 is pierced right through with as many apertures 157 as there are slots 141 of the plate 140, these apertures 157 having a shape oblong perpendicularly to the plane 129 and symmetrical relative to this and being distributed at the same interval p as the slots 141 of the plate 140 in the transverse direction 21.

Each of the apertures 157, which are identical, is delimited by four vertical faces, namely two faces 158, 159 oriented perpendicularly to the longitudinal direction 6, symmetrical relative to one another in relation to the plane 129 and spaced from one another perpendicularly to this plane at a distance substantially equal to the length L of a skewer 2 and two faces 160, 161 oriented perpendicularly to the transverse direction 21 and spaced from one another in this direction 21 at a distance $L_{18}$ smaller than the interval p, but much larger than the diameter d of the skewer 2, preferably larger than a multiple of this diameter; a suitable adjustment of the jack 154 or of limit detectors associated with this ensures that the limits of the to-and-fro movement of the slide 146 in the transverse direction 21 in relation to the plate 140 allow each slot 141 of the latter to open permanently upwards into a respective aperture 157 completely at least as regards the intermediate portion 145 of this slot 141.

The various apertures 157 themselves open permanently upwards onto the bottom 163 of a hopper 162 carried fixedly by the stand 91 of the apparatus 90 immediately above the slide 146.

According to an alternative version illustrated by dot-and-dash lines in FIGS. 4 and 5, the apertures 157 can be of a number smaller than that of the slots 141 and have such dimensions that each of them corresponds permanently to a plurality of slots 141. For this purpose, for example, the slide 146 can have the general shape of a frame delimited internally by four vertical faces perpendicular two by two, namely two faces arranged as mentioned in respect of the faces 158, 159, including their mutual spacings substantially equal to the length L of a skewer 2, and two faces arranged as mentioned in respect of the faces 160, 161, but spaced from one another in the direction 21 at a distance, not bearing a reference numeral, greater than the sum of the dimension $L_4$ or preferably the dimension $L_7$ of the end portions 144 of the slots 141 of the plate 140 and the product of the interval p and a number smaller by one unit than the number of these slots 141, in such a way that, during the to-and-fro movement of the slide 146 relative to the plate 140 in the transverse direction 21, each slot 141 of the latter can open permanently into the slide 146, at least as regards the intermediate portion 145; the said faces arranged as mentioned in respect of the faces 158 and 159 are connected to one another by means of rectilinear rods 250 of circular cross-section oriented in the longitudinal direction 6 and fixed to the slide 146; these rods 250 are of a number substantially smaller than that of the slots 141 of the plate 140, less one unit, for example of a number of two in the example illustrated, and are equally distributed in the transverse direction 21 within the slide 146; they have a diameter, not bearing a reference numeral, substantially larger than the diameter of a skewer 2, whilst remaining substantially smaller than the distance, not bearing a reference numeral, separating the lower face 147 and upper face 148 of the slide 146 from one another and are arranged so as to be set back upwards relative to the lower face 147, that is to say to be spaced from the upper face 143 of the plate 140 preferably at a distance greater by a few tenths of a millimeter than the diameter d of a skewer 2; furthermore, the diameter, not bearing a reference numeral, of these rods is such that, in view of their number, they leave between them and in relation to the inner faces of the slide perpendicularly to the transverse direction 21 a spacing, not designated by reference numeral, much larger than the diameter d of the skewer 2, preferably larger than a multiple of this diameter.

As regards this version too, moreover, the apertures 157 open permanently upwards onto the bottom 163 of the hopper 162.

The bottom 163 of the hopper 162 has the form of a rectangular orifice defined by two horizontal rectilinear edges 164 and 165 perpendicular to the longitudinal direction 6 and arranged symmetrically relative to one another in relation to the plane 129 at a distance from one another substantially equal to the length L of the skewer 2 and by two horizontal rectilinear edges 166, 167 arranged perpendicularly to the transverse direction 21 symmetrically relative to one another in relation to the plane 94 and spaced from one another perpendicularly to this plane at a distance $L_{19}$ both smaller than the distance, not bearing a reference numeral, separating the end faces 151 and 152 of the slide 146 from one another and larger than a dimension corresponding to the dimension $L_{18}$ of the apertures 157, plus the product of the interval p and a number smaller by one unit than the number of apertures 157, in respect of the embodiment of the slide 146 represented by unbroken lines, or to the dimension $L_7$ of the end portions 144 of the slots 141 of the plate 140, plus the product of the interval p and a number smaller by one unit than the number of these slots 141, in respect of this embodiment, as in that of the alternative version represented by dot-and-dash lines in FIGS. 5 and 6, in a manner which can easily be determined by an average person skilled in the art, in such a way that, during the to-and-fro movement of the slide 146, the apertures 157 remain permanently opposite the alignment with the bottom 163 of the hopper 162.

The actual hopper 162 is delimited essentially by four flat walls, namely two walls 168, 169 having towards the inside of this hopper 62 respective plane faces 170, 171 perpendicular to the plane 129 and spaced apart from one another upwards, symmetrically relative to one another in relation to the plane 94, respectively from the edge 166 of the bottom 163 and from the edge 167 of the latter, and two flat walls 172 and 173 having towards the inside of the hopper 162 respective vertical plane faces 174, 175 perpendicular to the plane 94 and symmetrical relative to one another in relation to the plane 129, these two faces 174 and 175 being spaced from one another at a distance corresponding substantially the length L of a skewer 2, in order to extend vertically upwards the edge 164 of the bottom 163 of the hopper 162 and the edge 165 of this bottom 163 respectively.

Thus, when the apparatus 90 is in operation, a large number of skewers 2 is freely arranged in the juxtaposed state inside the hopper 162, in such a way that their mid-axes 3 are oriented in the longitudinal direction 6 with some degree of approximation associated with the absence of rectilinearity of some skewers; because the faces 174 and 175 of the walls 172 and 173 of the hopper 162 are spaced from one another at a distance L, the skewers are thus respectively symmetrical in relation to the plane 129 with a good degree of approximation.

Skewers fall by gravity into the apertures 141 which they fill, whilst at the same time preserving their orientation approximately in the longitudinal direction 6, and the to-and-fro movement imparted to the slide 146 by the jack 154 allows the skewers 2 to engage one by one, by gravity, respectively into each slot 141, from where each skewer subsequently falls by gravity into the respectively corresponding passage 136, until it butts downwardly against the two shoulders 138 closing this passage 136 downwards, thereby forming in each passage 136 a continuous vertical stack of skewers 2 oriented approximately in the longitudinal direction 6 and mutually juxtaposed vertically, although each stack of skewers thus formed in each passage 136 has only a single skewer at each level in the transverse direction 21.

Such a fall of the skewers by gravity through the slots 141 of the plate 140 and then into the passages 136 without jamming, without an appreciable change in orientation of the skewers and without loss of their at least approximate symmetry in relation to the plane 129 occurs because, in each slot 141, each skewer 2 is held in the transverse direction 21 only over approximately ½ or ⅔ of its length, namely in the region of the intermediate portion 145 of the respective slot 141, whereas, even if it is severely bent within the limit of the tolerances generally allowed, it remains free in the direction 21 in the region of the end portions 144 of the slot 141, and because, in each passage 136, each skewer 2 is held in the direction 21 only in two narrowly localized zones, namely in contact with the columns 130 performing the function of localized slideways for vertical guidance on either side of the passage 136 and in a manner distributed symmetrically in relation to the plane 129, whereas elsewhere the skewers 2 are completely free in the transverse direction 21 when they are located in a passage 136.

When the apparatus 90 is in operation, each passage 136 is thus filled permanently with a continuous stack of skewers 2 oriented approximately in the longitudinal direction 6 and at least approximately symmetrically in relation to the plane 129, and in particular one of these skewers 2 forming the lower skewer of the stack bears downwards on the two corresponding stop shoulders 138, from which it can escape only by means of a movement the way 54 of the transverse direction 21.

Specifically, at the level 134 there are means 176 for simultaneously taking up the skewers 2 bearing at a given moment on the respective stop shoulders 138 of the various passages 136, especially by imparting to them a translational movement the way 54 in the respective passage 137, with such an amplitude that this translational movement brings each of these skewers directly in line with the respectively corresponding passage 132, namely an amplitude equal to $L_5$.

These means 176 comprise two horizontal rectilinear rails 177 arranged more specifically in the transverse direction 21 and symmetrical to one another in relation to the plane 129; perpendicularly to the latter, the two rails 177 are apart from one another at a distance, not bearing a reference numeral, much larger than the dimension L of a skewer; in the direction 21, they have a dimension, not bearing a reference numeral, larger than the overall size of the columns 130 as a whole in this direction.

The two rails 177 carry relatively slideably in the direction 21 two horizontal rectilinear crossmembers 178 arranged in the horizontal direction 6. fixed to one another in a way which will be described later and thus mutually connecting the two rails 177 on either side of the assembly of columns 130; in the transverse direction 21, the two crossmembers 177 are apart from one another at a distance, not bearing a reference numeral, larger than the overall size of the columns 130 as a whole in parallel with the transverse direction 21 by a value at least equal to $L_5$, and one of them is connected fixedly, opposite the other crossmember 178 with reference to the transverse direction 21, to the rod 179 of a jack 180 arranged in this transverse direction 21 and along the plane 129 and moreover possessing a body 181 fixed to the stand 91 of the apparatus 90; under automatic control by the means 245 according to an operating cycle of the apparatus 90 which will be described later, the jack 180 brings about an overall alternating to-and-fro sliding movement of the two crossmembers 178 in the transverse direction 21 along the rails 177 with an amplitude substantially equal to $L_5$.

The two crossmembers 178 are connected fixedly to one another by means of a perforated horizontal plate 182 arranged in line with the plate 140 and possessing particularly a plane horizontal upper face 183 located at the level 134 and a likewise plane horizontal lower face 184.

As shown in FIG. 7, the plate 182 has, in the plane 129, a cutout 185 passing vertically right through it, that is to say from one of its faces 183 and 184 to the other. In the direction 6, this cutout 185 extends from one of the crossmembers 177 to the other, whilst in the direction 6 it extends respectively on either side of the plane 129 from one of the two end faces 186 of the plate 182 to the other, these end faces being plane, vertical and parallel to the plane 129, to which they are turned and in relation to which they are symmetrical to one another; in the direction 6, the two end faces 186 are spaced from one another by a dimension $L_9$ slightly larger than $L_3$ plus double $L_{11}$, so that each of them is flush, without touching them, with the columns 130 located on the same side of the plane 129 as it.

However, as many notches 187 as passages 136 open into each of the end faces 186 towards the plane 129, namely 10 indentations 187 for each end face 186 in the example illustrated, these indentations 187 moreover passing vertically right through the plate 182.

The indentations 187, identical to one another when they are located on the same side of the plane 129 and symmetrical relative to one another in relation to this plane 129 when they are arranged respectively on either side of this, have respective shapes elongate in the longitudinal direction 6; more specifically, each of them, when seen in a horizontal plane, identically reproduces the end portion 144 of a slot 141, including its dimension $L_7$, two mutually adjacent indentations 187 moreover being spaced at the abovementioned interval p, whilst two indentations 187 symmetrical to one another in relation to the plane 129 possess perpendicularly to this an overall dimension equal to $L_6$.

However, along each of the end faces 186, the plate 182 carries fixedly on its upper face 183 as many dogs 188 as there are pairs of columns 130 symmetrical to one another in relation to the plane 129, in such a way that a dog 188 is located respectively on either side of each indentation 187. Each dog 188 thus possesses, in particular, a plane horizontal upper face 189 arranged at a vertical distance from the upper plate 183 of the plate 182 substantially equal to $L_4$, a plane vertical face 190 coplanar with the respective face 186, and two faces 191 likewise plane and vertical, but oriented perpendicularly to the transverse direction 21, in such a way that the respective faces 191 of two dogs 188 located respectively on either side of an indentation 187 are mutually parallel and located opposite one another, adhering, in the transverse direction 21, to substantially the same mutual spacing $L_4$ as two columns 130 located on the same side of the plane 129 and belonging to two adjacent pairs of columns 130; this spacing $L_4$, like the dimension $L_7$, is distributed equally on either side of a vertical plane 192 forming a plane of symmetry for each of two indentations 187 symmetrical to one another in relation to the plane 129.

According to an alternative embodiment of the dogs 188, the faces 191 which the dogs 188 located respectively on either side of an indentation 187 have towards one another are inclined slightly, for example at an angle of the order of 30°, relative to the vertical, so as to be spaced apart downwards from the corresponding plane 192, whilst remaining symmetrical to one another in relation to the latter and remaining parallel to the longitudinal direction 6. These faces 191 thus define between them a space which widens downwards from their connection to the respective upper face 189, in the region of which they are preferably spaced from one another at the abovementioned spacing $L_4$.

Of course, the plate 182 is displaced in a to-and-fro movement jointly with the crossmembers 178 in the direction 21, thereby causing it to move between a first limiting position, illustrated in FIG. 7, in which each plane 192 coincides with the plane of symmetry 244 of a respective passage 136, with the result that two indentations 187 symmetrical to one another in relation to the plane 129 can receive the lower skewer 2 of the stack of skewers located in the respective passage 136 at the transition between this passage 136 and the respective passage 137, retaining this skewer closely only in a localized manner in the immediate vicinity of the columns 130 by means of the faces 191 of the dog 188, and a second limiting position, not illustrated, in which each plane 192 coincides with the plane of symmetry 244 of the corresponding passage 132; during the translational movement of the plate 182 from this first limiting position to this second limiting position, the dogs 188 located upstream of a respective indentation 187 with reference to the way 54 perform the function of pushers ensuring a translational movement of the corresponding skewer in the passage 137 of the same amplitude and the same way, until this skewer is located in line with the passage 132 when the plate 182 occupies its second limiting position; the passage 132 then poses no obstacle to a descent of the corresponding skewer by gravity, but according to the present invention each skewer is then taken up by a respective cradle 193, which retains this skewer and which allows only a controlled descent of the latter in the passage 132; during this descent, the end portions of the skewer pass freely through the indentations 187 under the same conditions as those under which they passed through the end portions 144 of the slots 144, and then the jack 180 returns the plate 182 to its first limiting position, in which case that skewer which has become the lower skewer of each stack of skewers engaged in a passage 136, which was initially retained by the upper face 189 of the dogs 188 performing the function of a pusher, can fall between these before a new to-and-fro movement of the plate 182.

The level 134 thus constitutes, immediately above the transfer location 113 and for each stack of skewers 2 formed in a respective passage 136, a location for the take-up of the lower skewer of this stack of skewers by a respective cradle 193.

Each cradle 193 is oriented in the longitudinal direction 6 and is located between two columns 130 symmetrical to one another in relation to the plane 129, with the result that it has perpendicularly to the latter at most a dimension approximately equal to $L_3$ and more specifically slightly small than this.

In the example illustrated, each of the cradles 193 does not extend continuously from one to the other of the corresponding columns 130 symmetrical to one another in relation to the plane 129, but is formed from two indentations 194 mutually aligned in the longitudinal direction 6 and spaced from one another in this by a dimension $L_9$ as close as possible to $L_3$, each indentation 194 in fact being adjacent to one of the corresponding columns 130 on the side of the plane 129 and itself having, in the longitudinal direction 6, a dimension $L_8$ small in relation to $L_9$ and, for example, of the order of one fifth of $L_9$, these values being given only by way of non-limiting example.

Each indentation 194 has a cross-section corresponding approximately to the cross-section of a skewer, and it is open, on the one hand, both ways 29, 30 of the longitudinal direction 6 and, on the other hand, the way 48 of the transverse direction 21, in such a way that the two indentations 194 of each cradle 193 can receive and retain, in particular downwards, a respective intermediate portion 240 of a skewer 2 pushed the way 54 by the dogs 188 of the plate 182 under the abovementioned conditions, this skewer otherwise remaining free relative to the indentations 194 both in the middle portion 228 located between its portions 240 engaged in these and in its end portions 229.

Thus associated with each pair of columns 130 symmetrical to one another in relation to the plane 129, with the exception of the columns forming the end pair in the upstream direction with reference to the way 54, are as many cradles 193 formed from two indentations 194 as there are bores 18 in a row 9 on the body 11 of the apparatus 1, and these cradles 193 are fixed to one another and mutually superposed in the vertical direction, in such a way that their mid-axes 195 oriented in the longitudinal direction 6 are vertically distant from one another at the interval p and are located in the same vertical plane 196 perpendicular to the transverse direction 21 and coinciding with the plane of symmetry 244 of the passage 132 located between the pair of corresponding columns, on the one hand, and the pair of columns located immediately upstream of this pair the way 54, on the other hand.

When, preferably and as illustrated, each cradle 193 is formed from two indentations 194 arranged respectively on either side of the plane 129, the indentations located on the same side of the plane 129 and corresponding to cradles 193 thus mutually superposed are arranged in a respective vertical pillar 197, two pillars 197 symmetrical to one another in relation to the plane 129 thus being provided along each of the columns 130 of each of the pairs of columns, with the exception of the end pair in the upstream direction with reference to the way 54; nevertheless, the two pillars 197 are located between the columns 130 and the plane 129 and they are connected to one another respectively above the indentations 194 corresponding to the upper cradle 193 and below the indentations 194 corresponding to the lower cradle 193 by means of two rectilinear crossmembers 198 oriented in the longitudinal direction 6 and guided vertically slideably by complementing forms on the adjacent columns 130 of the two pillars 197; two pillars 197 and the two associated crossmembers 198 thus constitute an integral assembly ensuring that the superposed cradles 193 are guided vertically slideably along the corresponding columns 130, this applying to each pair of columns symmetrical to one another in relation to the plane 129, with the exception of the end pair in the upstream direction with reference to the way 54.

There are thus as many assemblies grouping two pillars 197 and two crossmembers 198 as there are rows 9, and each of these assemblies comprises as many cradles 193 as there are bores 18 in such a row.

Furthermore, the various assemblies grouping two pillars 197 and two crossmembers 198 are fixed to one another by means which will now be described, in such a way that the axes 195 of the cradles 193 of these various assemblies occupy relative positions strictly identical to those of the axes 19 of the bores 18, and that this relative position is preserved when, as will be described, these assemblies are displaced in unison between a high limiting position, illustrated in FIG. 5, in which the lower cradle 193 of each assembly is located at the transition from a respective passage 137 to a respective passage 132, whilst the various assemblies are located essentially between the level 134 and the plate 140, and a low limiting position, not illustrated, in the which the various assemblies are placed essentially at the transfer location 113, the upper cradles of the various assemblies being placed below the transition between the passages 137 and the passages 132 respectively, in such a way that the axes 195 of all the cradles 193 are located opposite the face 119 of the pushplate 118 and coincide with the axes 19 of the various bores 18 of the body 11 of the apparatus 1 placed by the carriage 95 in the skewer-receiving position.

For this purpose, the lower crossmember 198 of each assembly carries fixedly, in the plane 129, a respective vertical rectilinear rod 200 connecting this lower crossmember 198 downwards to a horizontal stage 201, to which all the rods 200 are thus connected fixedly.

Each rod 200 has a vertical dimension H: larger than the dimension $H_1$, so that, even when the assemblies of pillars 197 and of crossmembers 198 occupy their high limiting position, the plate 201 is located below the transfer location 113.

The plate 201 is mounted vertically slideably along vertical columns 202 fixed to the stand 91 and themselves carrying fixedly, below the plate 201 and at a vertical distance $H_4$ from this larger than H when the plate 201 occupies its position corresponding to the high limiting position for the assemblies of pillars 197 and of crossmembers 198, the body 203 of a vertical jack 204 located at the intersection of the planes 129 and 94 and possessing upwards a vertical rod 205 connected fixedly to the plate 201, in such a way that, by means of the jack 204 and under automatic control by the means 245, the various assemblies of pillars 197 and of crossmembers 198 and together with them the cradles 193 can be moved in unison in a vertical direction 243, particularly the downward way 242, between the abovementioned high and low limiting positions.

However, this movement takes place in steps at the interval p, at least as regards the change from the high limiting position to the low limiting position, in such a way that, during this movement, the cradles 193 of each of the assemblies of pillars 197 and of crossmembers 198 is presented successively at the transition of the corresponding passages 137 and 132 between the lower cradle and upper cradle and mark a standstill time sufficient to ensure that, as a result of the movement of the plate 182 first the way 54 and then way 48 under the action of the jack 180 with an amplitude $L_5$, a respective skewer can be introduced into each cradle 193, before starting the descent of this cradle 193 for the purpose of presenting the cradle 193 immediately above it at the transition between the corresponding passages 137 and 132, whilst the plate 182 returns the way 48 in order to take up a new skewer from the corresponding passage 136.

For example, for this purpose there are indexing means 207 in the form of a vertical rectilinear rod 209 fixed to the plate 201 and forming under the latter a projection over a dimension H: slightly larger than $H_4$, and this rod 209 possesses respectively on either side of a vertical mid-axis 210 vertically superposed stops 208 facing downwards and spaced from one another at double the interval p, as regards the stops 108 located on the same side of the rod 209, the stops 208 located on the other side of this rod likewise being mutually offset at double the interval p, but being offset at this interval p in relation to the stops 208 first mentioned; moreover, these indexing means 207 comprise, on either side of the rod 209, two jacks 211 which are oriented horizontally perpendicularly to the direction 210 and the bodies 212 of which are fixed to the stand 91 of the apparatus 90, whilst their rods 213 directed towards the rod 209 carry stops 214 directed upwards; by a suitable automatic control of the jacks 211 by the means 245 in accordance with the operating cycle of the apparatus 90 which has just been described with regard to the take-up of the skewers 2 by the cradles 193, the stops 214 interact alternately with the stops 208 located respectively on either side of the rod 209, in order successively to immobilize the various cradles 193 of each assembly of pillars 197 and of crossmembers 198 in downward movement at the transition between the associated passages 137 and 132.

It will thus easily be understood that, when the assemblies of pillars 197 and of crossmembers 198 reach the low limiting position, all the cradles 193 are equipped with a respective skewer 2 oriented in the longitudinal 6 with some degree of approximation associated with the possible natural bending of the skewers, although each skewer is symmetrical in relation to the plane 129 with an admissible degree of approximation and has free end portions 229 respectively on either side of the corresponding cradle 193; in particular, one of these end portions 229, corresponding to the end 4, of each skewer 2 is located immediately opposite the face 119 of the pushplate 118, whilst the end 5 of each skewer is located opposite a respective bore 18 of the apparatus 1 placed in the skewer-receiving position by the carriage 95, in a coaxial relationship of each skewer 2 with respective bore 18 with the degree of approximation associated with the possible natural bending of the skewers.

A movement of the pushplate 18 the way 30, until the face 119 comes into the vicinity of the columns 130 located on the same side of it as the plane 129, then exerts a push the way 30 on the ends 4 of all the skewers 2, this resulting in a translational movement of the skewers this way 30 in unison; during this translational movement, the ends 5 of the skewers penetrate into the bores 18 of the body 11 of the apparatus 1, where appropriate being guided for this purpose by the frustoconical zones 44, and then into the holes 45 of the slide 20 occupying its position of coaxiality of these holes 45 with the bores 18, in order to arrive at the main face 13 of the slide 11 or in the immediate vicinity of this, either remaining within the bores 18 or forming relative to the main face 13 a longitudinal projection identical for all the skewers 2.

Then, under the automatic control of the means 245, the means 99 take action to bring the slide 20 into its position of mutual misalignment of the holes 45 with the bores 18 and of immobilization of the skewers 2, in which position the locking means 41 immobilize the slide 20 in relation to the body 11.

Under automatic control by the means 245, the carriage 95 then brings the apparatus 1 into its position for substituting with an empty apparatus 1, the slide and body of which occupy a position of coaxiality of the holes and bores, and this substitution is carried out by a vertical sliding of these two apparatuses respectively upwards and downwards in the slideways 88 of the carriage 95.

Alternatively, in a way not shown, it will be possible that in the said substitution position there will not be such a substitution, but a direct automatic positioning of the apparatus 1 in an automatic skewering machine (not shown) having means suitable for unlocking the slide relative to the body before the skewering, then an automatic return of the apparatus 1 to the described position in relation to the apparatus 90 by means of a suitable design of the carriage 95 coming within the normal abilities of an average person skilled in the art.

After the transfer of the skewers 2 towards an apparatus 1 has taken place, the jack 204 returns the various assemblies of pillars 197 and of crossmembers 198 to the high limiting position for a new cycle of the take-up of skewers by the cradles 913 during a subsequent downward movement of the cradles 193 and under the effect of the joint to-and-fro movement of the plate 182 in the transverse direction 21.

Of course, the embodiment of the invention just described is only a non-limiting example, in relation to which many alternative versions can be provided, particularly as regards the practical embodiment of the cradles 193 and as regards the general arrangement of the apparatus 90.

As a non-limiting example of such a version, FIGS. 11 and 12 illustrate diagrammatically an apparatus 215 capable of distributing skewers in the above-described apparatus 1 by means of cradles 216 displaced not vertically, but horizontally.

However, the apparatus 215 has some elements common to the apparatus 90 just described, and these elements are designated by the same reference numerals as in the description of FIGS. 4 to 10.

Thus, once again FIGS. 11 and 12 show identically or in an alternative embodiment the vertical passage 136, now single, however, and delimited by two pairs of columns 130 symmetrical to one another in relation to a plane 217 and, with reference to this plane, arranged as described with reference to the plane 129 in the embodiment of the invention as stated in FIGS. 4 to 10. Upwardly, the channel 136 opens into a single slot 141 of a plate 218 which is otherwise comparable in all respects to the plate 140 and on which is superposed upwards a slide 219 similar to the slide 146, except that it has a single aperture 157; a jack 220 similar to the jack 154 makes it possible to drive this slide 219 automatically in a to-and-fro movement in the transverse direction 21 under the conditions mentioned in respect of the embodiment described with reference to FIGS. 4 to 10.

Upwardly, superposed on the slide 219 is a hopper 221 similar to the hopper 162 particularly as regards its dimensioning perpendicular to the plane 217, this hopper opening towards the aperture 157 of the slide 219 via its bottom 222, itself similar to the bottom 163 particularly as regards its dimensioning perpendicular to the plane 217.

In its lower part, the passage 136 opens out freely downwards at a location 223 for the take-up of the skewers one by one by a respective cradle 216.

The cradles 216 oriented in the longitudinal direction 6 travel horizontally past this location 223 in the transverse direction 21, more specifically the way 48 of the latter.

For this purpose, the cradles 216 could be designed identically to the cradles 193, that is to say consist of pairs of indentations arranged in pillars similar to the pillars 197, but then oriented horizontally in the transverse direction 21, but another design of the cradles 216 is illustrated, according to which each of them consists of two indentations 257 located in the extension of one another in the longitudinal direction 6 and each arranged on a respective conveyor belt 224 passing endlessly round two pulleys 225 suitably driven in rotation about respective horizontal axes 226 arranged in the longitudinal direction 6 and at the same level, in such a way that each belt 224 possesses particularly a horizontal rectilinear upper strand 227 oriented in the transverse direction 21; the two belts 224 are symmetrical to one another in relation to the plane 217 and are spaced from one another at a distance $L_{10}$ of the order of one third to three-quarters of the length L of a skewer and substantially equal to $L_3$, whilst each of these belts possesses, in the longitudinal direction 6, a dimension L: small in relation to the dimension $L_3$, so that the indentations 257 forming each cradle 216 can take up a skewer 2 by means of intermediate portions 240 of the latter, leaving free not only a middle portion 228, but also two end portions 229, with an at least approximate symmetry of each skewer 2 in relation to the plane 217.

Each of the indentations 257 is itself identical to an indentation 194, but it is made on the respective belt 224, in such a way that, in the region of the upper strand 227 of the latter, it is open vertically an upward way 230, so that the cradles 216 can receive and then retain the skewers 2 by gravity; between two successive indentations 257, the belt 224 has a continuous smooth zone 231.

In a zone upstream with reference to the way 48, the upper strand 227 of each belt 224 passes immediately below a lower end 232 of the two columns 130 located on the same side of the plane 217 as it, with a result that, during the joint movement of the two upper strands 227 the way 48, the indentations 257 forming the same cradle 126 are presented successively under the passage 136, in order to receive from the latter by gravity the skewer 2 then constituting the lower skewer of the stack of skewers formed there permanently; this skewer 2 is subsequently driven the way 48, whilst a zone 231 of each belt 224 blocks the passage 136 downwards, until a new pair of indentations 257 is presented under it in order to take up a skewer there again.

During the displacement of the two upper strands 227 the way 48, the cradles 216 are thus equipped in succession with respective skewers and are subsequently driven to a location 223 for the transfer of these skewers 2 towards an apparatus 1, in this case this location 233 being juxtaposed horizontally the way 48 with the take-up location 223 and thus being offset the way 48 relative to alignment with the hopper 221.

At this transfer location 233, a carriage 234 (not shown) similar to the carriage 95 and offset relative to alignment with the hopper 221 the way 48 and the way 30 presents the apparatus 1 in a skewer-receiving position identical to that described previously, in that the axes 19 of the bores 18 are oriented in the longitudinal direction 6 and each row 10 is oriented horizontally in the transverse direction 21, in such a way that the axes 19 of the bores 18 of this row 19 are arranged in the same horizontal plane 241.

In the direction 21 and in the region of the upper strand 227 of each belt 224, the indentations 217 forming the cradles 216 are spaced from one another at the interval p which, in each row 10, separates the axes 19 of two adjacent bores 18 from one another, with the result that, at the location 233, it is possible to present a skewer 2 coaxially opposite each bore 18 of a row 10, provided that the latter is located at a suitable level in the vertical direction.

For this purpose, the carriage 234 receiving the apparatus 1, whilst otherwise being identical to the carriage 95, is mounted vertically movably relative to the stand 236 of the machine under the action of a jack 235, with which are associated indexing means similar to the means 207 described with reference to the embodiment of FIGS. 4 to 10, in a manner not shown, in such a way that there are presented successively in the region of the upper strands 227 of the two belts 224 the various rows 210 of the apparatus 1, the face 12 of which is distant from the plane 217 at a distance equal to half of $L_1$, $L_1$ being defined as before; this movement of the apparatus 1 under the action of the jack 235 is an upward movement, the upper row 10 being presented first in a coaxial relationship of its bores with the cradles 216, then rows 10 further and further down subsequently being presented in such a relationship as far as the bottom row 10 during a cycle of equipping an apparatus 1 with skewers 2.

Moreover, located directly opposite the upper strand 227 of the two belts 224 in the longitudinal direction 6, on the opposite side to the apparatus 1 in relation to the plane 217, is a pushplate 237 having towards the plane 217 a vertical push face 238 perpendicular to the longitudinal direction 6.

Under the action of a jack 239 arranged in the longitudinal direction 6, the plate 237 can be displaced in this direction between a limiting position, represented by unbroken lines in FIG. 12, in which it is located at the same distance from the plane 217 of the face 12 of the body 11 of the apparatus 1, that is to say at a distance $L_1$ from this face 12, and a position, represented by dot-and-dash lines, in which it is now located only at the distance $L_2$ from this, defined as before, and consequently is adjacent to the upper strand 227 of that of the belts 224 which is located on the same side of the plane 217 of the plate 237.

In the transverse direction 21, the face 238 has a dimension substantially equal to $l_6$, so that it is placed directly opposite, in the longitudinal direction 6, a row 10 of bores 18 located in the region of the upper strands 227 of the belts 224 and can thus push into the bores 18 of this row, reaching under the action of the jack 239 its position represented by dot-and-dash lines in FIG. 12, the skewers 2 taken up in succession by the cradles 216 at the location 232, before returning to its position represented by unbroken lines in FIG. 12, whilst the jack 235 raises the apparatus 1 by the interval p separating two adjacent rows 10 from one another, in order to present at the transfer location 233 the bores 18 immediately below those which have just been equipped with skewers.

Preferably, the conveyor belts 224 stop during the to-and-fro movement of the plate 237.

When the apparatus 1 reaches a high limiting position, in which all the bores 18 have been equipped with skewers, means similar to the means 99 and carried by the carriage 234 bring the slide 20 relative to the body 11 into its position for immobilizing the skewers, and there can be substituted for the apparatus 1 thus equipped with skewers an apparatus 1 to be equipped, the upper row 10 of which is presented in the region of the upper strands 227 of the belts 224 as a result of action on the jack 235, in order to initiate a new cycle of equipping an apparatus 1 with skewers. Alternatively, the apparatus 1 equipped with skewers could be integrated automatically into an automatic skewering machine, as said of the apparatus 90.

Of course, this cycle can be controlled automatically by means which are similar to the means 245 and the production of which comes within the normal abilities of an average person skilled in the art.

It will easily be understood that the present invention can also have many other alternative versions not departing from its scope; in particular, the references made to verticality and horizontality are only for linguistic convenience, and the various components described with reference to these orientations could have these only approximately or could have different orientations as a result of adaptations coming within the normal abilities of an average person skilled in the art, without thereby departing from the scope of the present invention.

I claim:

1. An apparatus for the distribution of skewers having an approximately rectilinear shape, a mid-axis, an approximately specific length along this mid-axis and an approximately constant cross-section of approximately specific diameter perpendicularly to this mid-axis, especially wooden skewers intended for making brochettes, among respective bores of a reception apparatus, such as a loading apparatus of a skewering machine said bores being parallel to one another and mutually juxtaposed in a row in which they are spaced from one another at a specific interval, said distribution apparatus comprising:

a plurality of cradles oriented in a specific longitudinal direction, mutually juxtaposed transversely and spaced transversely from one another at said interval, each cradle having a cross-section corresponding approximately to said cross-section of a skewer and being open one specific transverse way and also being open both ways in said longitudinal direction, means for presenting each cradle at a take-up location for the take-up of a respective skewer and for placing the cradles and the reception apparatus in such a relative position that each cradle is located opposite a respective bore in said longitudinal direction, at a location for the transfer of the skewers from the cradle towards the reception apparatus, means for receiving the skewers in the mutually juxtaposed state and presenting them successively at said take-up location, in such a way that their midaxes are oriented approximately in said longitudinal direction and that they are respectively approximately symmetrical in relation to a specific transverse plane, and for respectively introducing into each cradle oppositely to said transverse way a skewer, the mid-axis of which is oriented approximately in said longitudinal direction, at said take-up location, means for imparting to the skewers introduced into the cradles a translational movement one specific way of said longitudinal direction going from the cradles towards the reception apparatus, at said transfer location, in order to disengage the skewers from the cradles and engage them into the bores, wherein each cradle possesses, in said longitudinal direction, a dimension substantially smaller than said length and has a transverse plane of symmetry coinciding approximately with said specific transverse plane of said take-up location, so as to take up a respective skewer, whilst preserving substantially the same shape for it, at said take-up location.

2. The apparatus as claimed in claim 1, wherein the said dimension is at most equal to one third of the said length.

3. The apparatus as claimed in claim 1, wherein each cradle is formed from two indentations mutually aligned in said longitudinal direction and spaced from one another in said longitudinal direction at a spacing smaller than said length, each indentation having said cross-section and being open said specific transverse way, and also being open both ways in said longitudinal direction, in such a way that, at said take-up location, each skewer has two free end portions, a free middle portion between said indentations and two intermediate portions engaged in said indentations.

4. The apparatus as claimed in claim 3, wherein the said spacing is of the order of one third to three quarters of the said length.

5. The apparatus as claimed in claim 1, wherein the means for imparting a translational movement to the skewers at the said transfer location comprise a transverse pushplate located opposite the reception apparatus in relation to the cradles and opposite these as a whole in the said longitudinal direction at the said transfer location, and means for driving the transverse pushplate in a to-and-fro movement in the said longitudinal direction.

6. The apparatus as claimed in claim 1, wherein the said longitudinal direction is approximately horizontal 7. The apparatus as claimed in claim 6, wherein the means for receiving the skewers and successively presenting them at the said take-up location and for introducing a skewer into each cradle at the said take-up location comprise a skewer-receiving hopper overhanging the said take-up location, symmetrical in relation to the said specific transverse plane and having in the said longitudinal direction a dimension substantially equal to the said length, and an approximately vertical passage opening upwards into the said hopper and downwards at the said take-up location, the said passage being symmetrical in relation to the said specific transverse plane and having, in horizontal section:
in the said horizontal direction, a dimension at least equal to the said length,
transversely to the said longitudinal direction, a dimension substantially equal to the said diameter over a longitudinal dimension substantially smaller than the said length, in a manner distributed symmetrically in relation to the said transverse plane, and a dimension substantially larger than the diameter elsewhere.

8. The apparatus as claim in claim 7, comprising means for driving the skewers in an approximately horizontal transverse to-an-fro movement between said hopper and said passage.

9. The apparatus as claimed in claim 7, wherein the said passage possesses, in horizontal section, transversely to the said longitudinal direction, a dimension substantially equal to the said diameter over a longitudinal dimension at most equal to one third of the said length.

10. The apparatus as claimed in claim 7, wherein the said passage comprises two groups, symmetrical to one another in relation to the said transverse plane, of two approximately vertical slideways parallel to and spaced from one another by approximately the said diameter respectively on either side of the said passage, the said groups being spaced from one another in the said longitudinal direction at a spacing smaller than the said length.

11. The apparatus as claimed in claim 10, wherein the said spacing is of the order of one third to three quarters of the said length.

12. The apparatus as claimed in claim 7, wherein the said transverse way is approximately vertically upwards, wherein the means for presenting each cradle at the said take-up location comprise means for causing the cradles to travel past the said take-up location one specific way of an approximately horizontal transverse direction immediately below said passage, and wherein the said passage opens approximately vertically downwards so as to allow the skewers to descend one by one into the cradles by gravity.

13. The apparatus as claimed in clam 12, wherein said transfer location is juxtaposed with said take-up location said one specific way of said approximately horizontal transverse direction, and wherein the means for placing the cradles and the reception apparatus in said position relative to said transfer location comprise means for arranging the reception apparatus in such a way that it is offset relative to alignment with said hopper said one specific way of said transverse direction and also said one specific way of said longitudinal direction, that said row is approximately horizontal and arranged in an approximately horizontal longitudinal plane common to the cradles, and that said bores are longitudinal.

14. The apparatus as claimed in claim 13, wherein, in relation to a reception apparatus comprising a plurality of mutually parallel identical rows of bores occupying the same relative positions in the said rows, the means for placing the cradles and the reception apparatus in the said position relative to the said transfer location comprise means for the sequential vertical translational movement of the reception apparatus in order to place each row of bores successively in the said approximately horizontal longitudinal plane.

15. The apparatus as claimed in claim 7, wherein the said transverse way is approximately horizontal, wherein the means for presenting each cradle at the said take-up location comprise means for causing the cradles to travel past the said take-up location one specific way of an approximately vertical transverse direction, the said transverse way being oriented towards the said passage, wherein, at the said take-up location, the said passage opens out approximately horizontally the opposite way to the said transverse way, whilst it has approximately horizontal downward stop means for the skewers, and wherein the means for receiving the skewers and successively presenting them at the said take-up location and for introducing a skewer into each cradle at the said take-up location comprise means for approximately horizontal transverse pushing the opposite way to the said transverse way at a level immediately above that of the said stop means.

16. The apparatus as claimed in claim 15, wherein said passage comprises two groups, symmetrical to one another in relation to said transverse plane, of two approximately vertical slideways parallel to and spaced from one another by approximately said diameter respectively on either side of said passage, said groups being spaced from one another in said longitudinal direction at a spacing smaller than said length, and
wherein the pushing means comprise two pushers respectively adjacent to one of said groups of slideways or the other at a level immediately above that of said stop means for the skewers, and means for driving said pushers in a synchronous to-and-fro movement in an approximately horizontal transverse direction.

17. The apparatus as claimed in claim 15, wherein said passage comprises two groups, symmetrical to one another in relation to said transverse plane, of two approximately vertical slideways parallel to and spaced from one another by approximately said diameter respectively on either side of said passage, said groups being spaced from one another in said longitudinal direction at a spacing smaller than said length, and
wherein said stop means comprise two approximately horizontal shoulders respectively adjacent to one of said groups of slideways or the other.

18. The apparatus as claimed in claim 15, comprising means for controlling the means for presenting each cradle at said take-up location and the pushing means so as respectively to displace the cradles step by step said way of said approximately vertical transverse direction, by stopping the cradles successively at said take-up location, and to push a respective skewer into each cradle stopped successively at said take-up location.

19. The apparatus as claimed in claim 15, wherein the said way of the said vertical transverse direction is downwards, wherein the said transfer location is located below the said take-up location, and wherein the means for placing the cradles and the reception apparatus in the said relative position comprise means for placing the reception apparatus at a level below that of the said take-up location, in such a way that it is offset relative to alignment with the said hopper the said specific way of the said longitudinal direction, that the said row is approximately vertical and arranged in an approximately vertical longitudinal plane common to the cradles, and that the said bores are longitudinal.

20. The apparatus as claimed in claim 19, wherein, in relation to a reception apparatus comprising a plurality of mutually parallel identical rows of bores occupying the same relative positions in said rows, there are said plurality of cradles, said location for the take-up of a respective skewer, said passage, said stop means and said location for the transfer of the skewers, each in the same number mutually juxtaposed said transverse way as there are rows, wherein, for each of said pluralities of cradles, there are respectively said means for presenting each cradle successively at said respective location for the take-up of a skewer and for placing the cradles and the reception apparatus in said position relative to said respective location for the transfer of skewers, and said means for imparting a translational movement to the skewers at said respective location for the transfer of skewers, wherein there are means for synchronously controlling said means for presenting each cradle successively at said respective location for the take-up of a skewer and for placing the cradles and the reception apparatus in said position relative to said respective location for the transfer of skewers and said means for imparting a translational movement to the skewers at said respective location for the transfer of skewers, and wherein the means for placing the cradles and the reception apparatus in said position relative to said respective transfer location comprise means for immobilizing the reception apparatus in a position in which each row of bores is arranged in a respective approximately vertical longitudinal plane common to the cradles of a respective plurality of cradles.

* * * * *